US012693859B2

(12) United States Patent　　(10) Patent No.:　US 12,693,859 B2

Schelm et al.　　　　　　　　　　(45) Date of Patent:　　　Jul. 28, 2026

(54) CONVERT INSTRUCTION WITH OVERFLOW RESULT CONTROL

(71) Applicant: INTERNATIONAL BUSINESS MACHINES CORPORATION, Armonk, NY (US)

(72) Inventors: Kerstin Claudia Schelm, Stuttgart (DE); Bruce Conrad Giamei, Lagrangeville, NY (US); Timothy J Slegel, Staatsburg, NY (US); Jonathan D. Bradbury, Poughkeepsie, NY (US); Reid Copeland, Ontario (CA); Xin Guo, Toronto (CA); Michael Klein, Schoenaich (DE); Petra Leber, Ehningen (DE); Andreas Wagner, Wildberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/732,923

(22) Filed: Jun. 4, 2024

(65) Prior Publication Data

US 2025/0370748 A1　　Dec. 4, 2025

(51) Int. Cl.
G06F 9/30 (2018.01)

(52) U.S. Cl.
CPC ...... G06F 9/30025 (2013.01); G06F 9/30038 (2023.08); G06F 9/30094 (2013.01); *G06F 9/30036* (2013.01); *G06F 9/30185* (2013.01)

(58) Field of Classification Search
CPC ............. G06F 9/30025; G06F 9/30036; G06F 9/3861; G06F 9/38585; G06F 9/3865; G06F 9/30094
See application file for complete search history.

(56) References Cited

U.S. PATENT DOCUMENTS 5,043,867 A * 8/1991 Bhandarkar .......... G06F 9/3001
712/7
11,442,726 B1 9/2022 Schwarz et al.
(Continued)

FOREIGN PATENT DOCUMENTS

WO　2016/199154 A1　12/2016
WO　2020/161554 A1　8/2020

OTHER PUBLICATIONS

Fadi Y. Busaba, Christopher A. Krygowski, Wen H. Li, Eric M. Schwarz, Steven R. Carlough, "The IBM 2900 Decimal Arithmetic Unit", Aug. 7, IEEE, pp. 1335-1339 (Year: 2002).*

(Continued)

*Primary Examiner* — Courtney P Spann

(74) *Attorney, Agent, or Firm* — Edward J. Wixted, III, Esq.; Blanche E. Schiller, Esq.; Heslin Rothenberg Farley & Mesiti P.C.

(57) ABSTRACT

An instruction configured to perform data conversion is executed. The executing the instruction includes determining that an overflow condition exists in a change of a value, specified by the instruction, from one data format to another data format. It is determined that an overflow result control of the instruction is set to a selected value. A result of executing the instruction is provided. The providing the result includes placing a chosen default value in a result location based on determining that the overflow condition exists and that the overflow result control is set to the selected value.

25 Claims, 9 Drawing Sheets

(56) References Cited

U.S. PATENT DOCUMENTS

| | | | |
|---|---|---|---|
| 11,620,153 B2 | 4/2023 | Lichtenau et al. | |
| 11,663,004 B2 | 5/2023 | Schwarz et al. | |
| 2003/0188129 A1* | 10/2003 | Henry ................. | G06F 9/30189 |
| | | | 712/210 |
| 2022/0276866 A1* | 9/2022 | Schwarz ............. | G06F 9/30025 |
| 2022/0405123 A1 | 12/2022 | Bradbury et al. | |

OTHER PUBLICATIONS

Lake, G. T, "Hardware conversion of decimal and binary numbers", ACM, pp. 468-469 (Year: 1962).*
IBM, "z/Architecture Principles of Operation," IBM Publication No. SA22-7832-13, Fourteenth Edition, May 2022, pp. 1-2124.
International Searching Authority, "Notification of Transmittal of the International Search Report and the Written Opinion of the International Searching Authority, or Declaration," Patent Cooperation Treaty Aug. 12, 2025, 10 pages, International Application No. PCT/EP2025/063860.

* cited by examiner

100

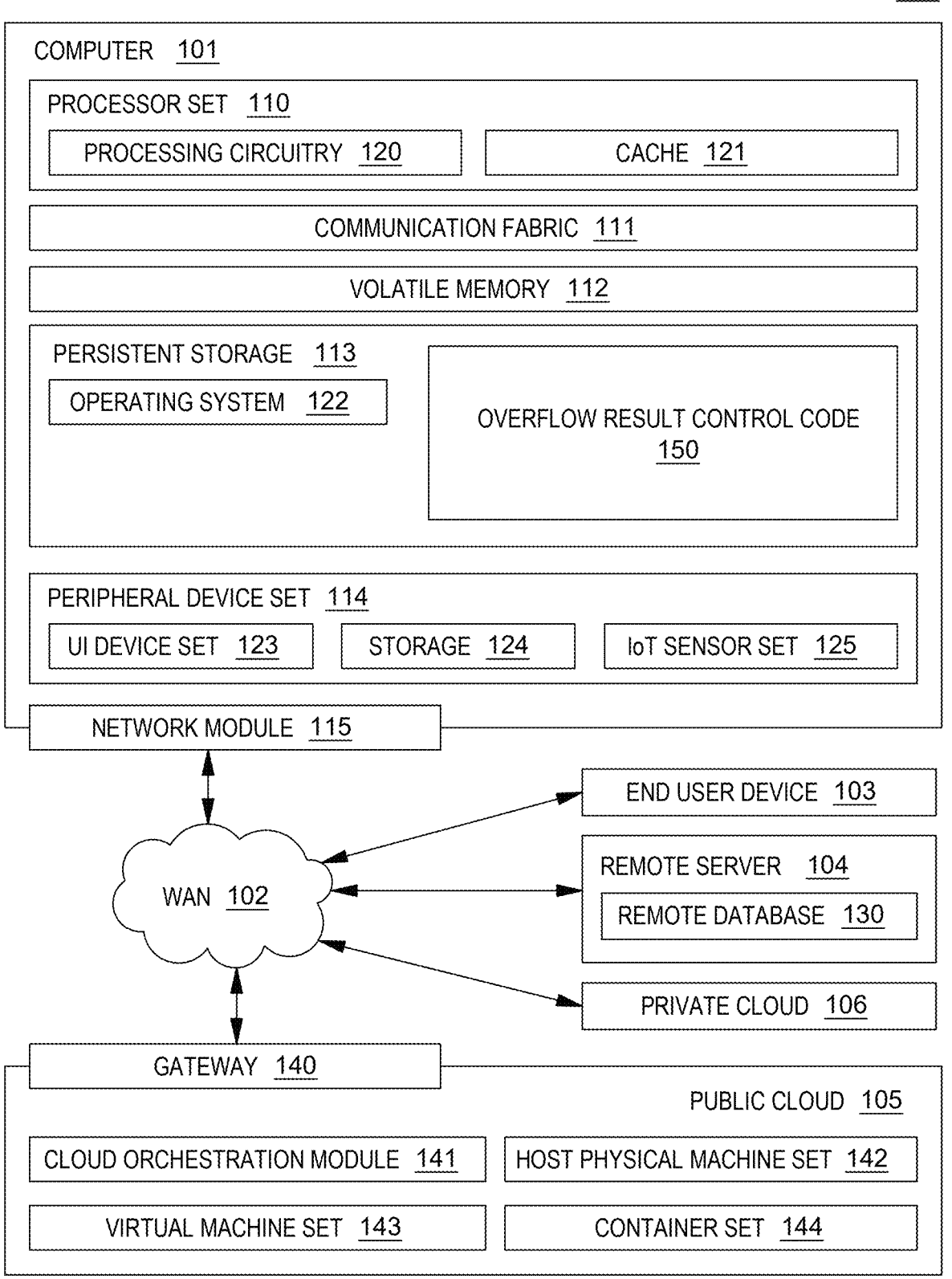

COMPUTER  101

PROCESSOR SET  110

PROCESSING CIRCUITRY  120

CACHE  121

COMMUNICATION FABRIC  111

VOLATILE MEMORY  112

PERSISTENT STORAGE  113

OPERATING SYSTEM  122

OVERFLOW RESULT CONTROL CODE  150

PERIPHERAL DEVICE SET  114

UI DEVICE SET  123

STORAGE  124

IoT SENSOR SET  125

NETWORK MODULE  115

WAN  102

END USER DEVICE  103

REMOTE SERVER  104

REMOTE DATABASE  130

PRIVATE CLOUD  106

GATEWAY  140

PUBLIC CLOUD  105

CLOUD ORCHESTRATION MODULE  141

HOST PHYSICAL MACHINE SET  142

VIRTUAL MACHINE SET  143

CONTAINER SET  144

Figures 3A, 3B, 3C:
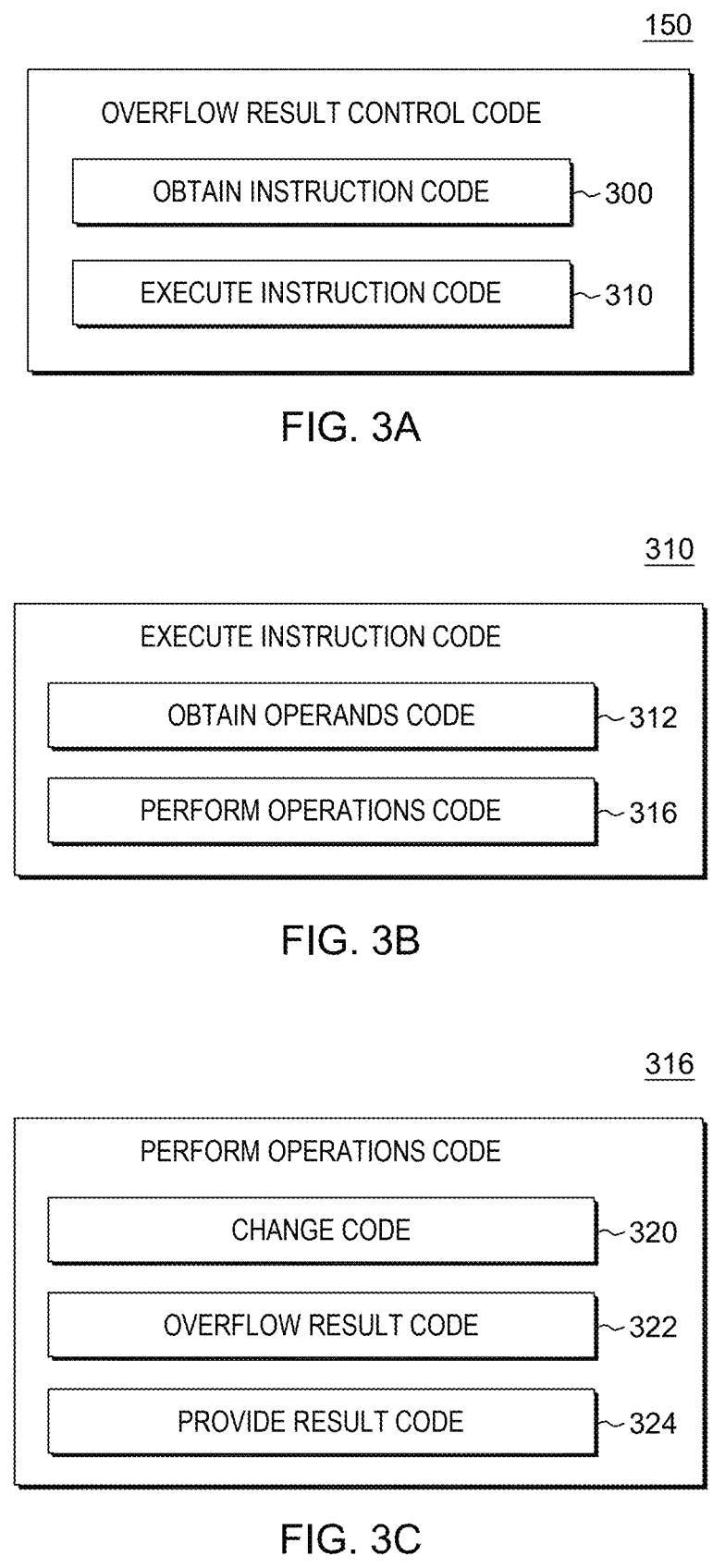

OVERFLOW RESULT CONTROL CODE

OBTAIN INSTRUCTION CODE ~300

EXECUTE INSTRUCTION CODE ~310

EXECUTE INSTRUCTION CODE

OBTAIN OPERANDS CODE ~312

PERFORM OPERATIONS CODE ~316

PERFORM OPERATIONS CODE

CHANGE CODE ~320

OVERFLOW RESULT CODE ~322

PROVIDE RESULT CODE ~324

VECTOR CONVERT TO BINARY INSTRUCTION

408

410

36

CONVERT INSTRUCTION WITH OVERFLOW RESULT CONTROL

BACKGROUND

One or more aspects relate, in general, to facilitating processing within a computing environment, and in particular, to improving processing within the computing environment.

Computer programs executing within a computing environment perform operations on data. The data may be in one of a plurality of data formats. For instance, the data may be in a signed packed decimal data format. In such a data format, each digit of a decimal number (e.g., 0-9) is encoded as a binary value and stored in a nibble (e.g., four bits) of a byte (e.g., eight bits). For instance, the value 24 is stored as a 2 in binary and then a 4 in binary (e.g., 00100100 in a byte). The sign of the decimal number, if any, is stored, for instance, in the rightmost nibble of the rightmost byte of the representation. The sign may be encoded as a binary representation of A-F, and multiple codes may be used to represent positive or negative. For instance, positive may be represented by A, C, F and negative may be represented by B, D; other examples are possible. Further, there may be default encodings for positive and/or negative.

Operations that may be performed on the data, such as signed packed decimal numbers or other data, include computational operations, as well as the converting of data from one data format to another data format.

Improvements to instructions that convert the data from one data format to another data format are sought to improve processing within the computing environment.

SUMMARY

Shortcomings of the prior art are overcome, and additional advantages are provided through the provision of a computer program product. The computer program product includes a set of one or more computer-readable storage media and program instructions, collectively stored in the set of one or more computer-readable storage media, for causing at least one computing device to perform computer operations including executing an instruction configured to perform data conversion. The executing the instruction includes determining that an overflow condition exists in a change of a value, specified by the instruction, from one data format to another data format. A determination is made that an overflow result control of the instruction is set to a selected value. A result of executing the instruction is provided. The providing the result includes placing a chosen default value in a result location based on determining that the overflow condition exists and that the overflow result control is set to the selected value.

In one or more aspects, a computer program product is provided. The computer program product includes a set of one or more computer-readable storage media and program instructions, collectively stored in the set of one or more computer-readable storage media, for causing at least one computing device to perform computer operations including executing an instruction. The executing the instruction includes changing at least a portion of a value specified by the instruction from one data format to another data format. A determination is made that an overflow condition occurred based on changing the at least the portion of the value from the one data format to the another data format, and that an overflow result control of the instruction is set to a selected value. A result of executing the instruction is provided. The providing the result includes placing a chosen default value in a result location based on determining that the overflow condition occurred and that the overflow result control is set to the selected value.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to incorporate and use one or more aspects of the present disclosure;

FIG. 3A depicts one example of the overflow result control code of FIG. 1, in accordance with one or more aspects of the present disclosure;

FIG. 3B depicts one example of the execute instruction code of the overflow result control code of FIG. 3A, in accordance with one or more aspects of the present disclosure;

FIG. 3C depicts one example of the perform operations code of the execute instruction code of FIG. 3B, in accordance with one or more aspects of the present disclosure;

DETAILED DESCRIPTION

Figure 2:
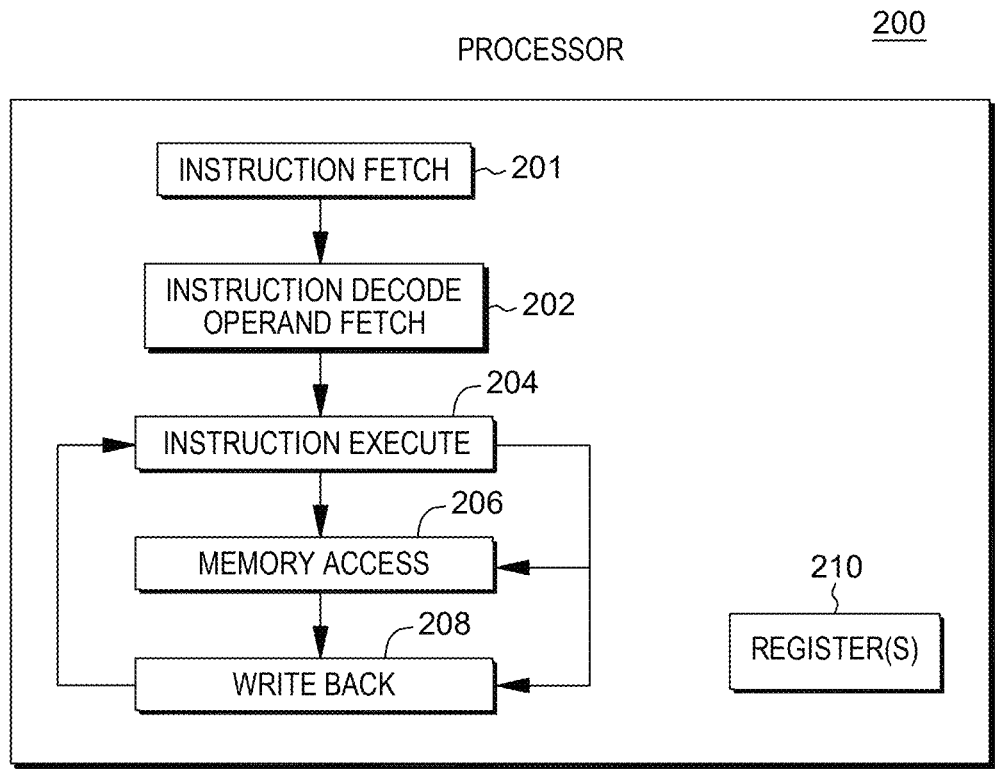
FIG. 2 depicts one example of further details of a processor of the processor set of FIG. 1, in accordance with one or more aspects of the present disclosure.

In accordance with one or more aspects of the present disclosure, a capability is provided to facilitate processing within a computing environment. In one or more aspects, the capability includes improving processing of instructions that perform operations in which an overflow condition exists. One example of such an operation is a change (also referred to as a convert) operation in which a value in one data format is changed to a value in another data format. In changing the value in one data format to another data format, an overflow condition may occur in which the changed value does not fit in the result location.

In accordance with one or more aspects, a single instruction (e.g., a single architected instruction) is defined and configured to perform a change operation, in which an overflow condition may occur and based thereon, overflow control processing is performed. In one example, the overflow control processing includes overflow result control processing used to determine a result of the instruction when an overflow condition exists. The overflow result control processing includes determining whether an overflow condition exists, checking an overflow result control of the instruction based on existence of the overflow condition and placing a chosen default value (e.g., one or more zeros) in a result location to indicate the overflow condition based on the overflow result control being set to a selected value (e.g., one). The overflow result control processing is performed, in one or more aspects, prior to completing the change of the value from the one data format to the other data format.

In one or more aspects, a computer program product is provided. The computer program product includes a set of one or more computer-readable storage media, and program instructions, collectively stored in the set of one or more computer-readable storage media, for causing at least one computing device to perform computer operations including executing an instruction configured to perform data conversion. The executing the instruction includes determining that an overflow condition exists in a change of a value, specified by the instruction, from one data format to another data format. A determination is made that an overflow result control of the instruction is set to a selected value. A result of executing the instruction is provided. The providing the result includes placing a chosen default value in a result location based on determining that the overflow condition exists and that the overflow result control is set to the selected value. By placing a chosen default value in a result location based on determining that the overflow condition exists and that the overflow result control is set to the selected value enables a result to be provided for the instruction and allows the instruction to complete with a condition code even if the change of the value results in an overflow condition. The use of the overflow result control allows the overflow condition to be detected prior to completing the change and allows for a condition code to be provided. This increases processing speed by not requiring a complete conversion of the value even though the overflow condition is detected.

Additionally, or alternatively, in one or more embodiments, the one data format is a decimal data format and the another data format is a binary data format. Conversion from decimal to binary is facilitated and improved, particularly in the event of an overflow condition, by streamlining the processing and eliminating converting operations based on detecting the overflow condition.

Additionally, or alternatively, in one or more embodiments, the chosen default value includes a selected number of zeros. By using the chosen default value (e.g., the selected number of zeros), conversion is facilitated and improved, particularly in the event of an overflow condition, by streamlining the processing and eliminating converting operations based on detecting the overflow condition.

Additionally, or alternatively, in one or more embodiments, the overflow result control is included in a mask field of the instruction. By including the overflow result control in a mask field of the instruction, instruction access to the overflow result control is facilitated, improving processing speed and reducing storage/memory requirements and latency access to storage/memory to obtain the overflow result control.

Additionally, or alternatively, in one or more embodiments, the value is included in at least one register specified by the instruction, the overflow result control is included in a mask field of the instruction and the result location is at least one register specified by the instruction. By using registers and a mask field of the instruction, instruction execution and processing speed are improved. Storage/memory requirements and latency access are reduced.

Additionally, or alternatively, in one or more embodiments, the determining that the overflow condition exists includes executing the instruction to perform up to a selected number of converting operations to change the value from the one data format to the another data format. The selected number of converting operations is dependent on a size of the result location. It is determined that one or more additional operations over the selected number of converting operations is to be performed to complete the change of the value from the one data format to the another data format. The determining that the one or more additional operations is to be performed signifies that the overflow condition exists. By determining that the additional operations are to be performed, absent performing the additional operations, processing speed is increased by not requiring a complete conversion of the value even though the overflow condition is detected.

Additionally, or alternatively, in one or more embodiments, the determining that the overflow condition exists occurs prior to completing the change of the value from the one data format to the another data format. Determining that the overflow condition exists prior to completing the change improves performance, reducing processing cycles.

Additionally, or alternatively, in one or more embodiments, the instruction further includes a condition code set control, and based on the condition code set control being set to a particular value, a condition code is provided based on executing the instruction. Use of the condition code set control with the overflow result control facilitates processing by enabling a number of converting operations performed by the instruction to change the value to be reduced when an overflow condition is detected and the condition code set control and overflow result control are set to a particular value and a selected value, respectively.

Additionally, or alternatively, in one or more embodiments, the computer operations further include executing the instruction another time. The executing the instruction another time includes determining that the overflow condition exists in the change of another value from the one data format to the another data format, determining that the overflow result control of the instruction is set to another selected value, and providing another result of executing the instruction the another time. The providing the another result includes placing at least a portion of a result value of the change of the another value in the result location based on determining that the overflow condition exists and that the overflow result control is set to the another selected value. By providing the overflow result control, the use of the default value is controlled in that such use is selectable, facilitating processing and improving performance.

Additionally, or alternatively, in one or more embodiments, the computer operations further include executing the instruction a further time. The executing the instruction the further time includes determining that the overflow condition does not exist in the change of a further value from the one data format to the another data format, and providing a further result of executing the instruction the further time. The providing the further result includes placing a result value of the change of the further value in the result location based on determining that the overflow condition does not exist. By providing the overflow result control, the instruction may be used for both overflow and non-overflow conditions, facilitating processing and improving performance.

In accordance with one or more aspects, each of the embodiments is separable and optional from one another. Further, embodiments may be combined with one another.

In one or more aspects, a computer system is provided. The computer system includes at least one computing device, a set of one or more computer-readable storage media, and program instructions, collectively stored in the set of one or more computer-readable storage media, for causing the at least one computing device to perform computer operations including executing an instruction configured to perform data conversion. The executing the instruction includes determining that an overflow condition exists in a change of a value, specified by the instruction, from one data format to another data format. It is determined that an overflow result control of the instruction is set to a selected value. A result of executing the instruction is provided. The providing the result includes placing a chosen default value in a result location based on determining that the overflow condition exists and that the overflow result control is set to the selected value. By placing a chosen default value in a result location based on determining that the overflow condition exists and that the overflow result control is set to the selected value enables a result to be provided for the instruction and allows the instruction to complete with a condition code even if the change of the value results in an overflow condition. The use of the overflow result control allows the overflow condition to be detected prior to completing the change and allows for a condition code to be provided. This increases processing speed by not requiring a complete conversion of the value even though the overflow condition is detected.

Additionally, or alternatively, in one or more embodiments, the value is included in at least one register specified by the instruction, the overflow result control is included in a mask field of the instruction and the result location is at least one register specified by the instruction. By using registers and a mask field of the instruction, instruction execution and processing speed are improved. Storage/memory requirements and latency access are reduced.

Additionally, or alternatively, in one or more embodiments, the determining that the overflow condition exists includes executing the instruction to perform up to a selected number of converting operations to change the value from the one data format to the another data format. The selected number of converting operations is dependent on a size of the result location. It is determined that one or more additional operations over the selected number of converting operations is to be performed to complete the change of the value from the one data format to the another data format. The determining that the one or more additional operations is to be performed signifies that the overflow condition exists. By determining that the additional operations are to be performed, absent performing the additional operations, processing speed is increased by not requiring a complete conversion of the value even though the overflow condition is detected.

Additionally, or alternatively, in one or more embodiments, the determining that the overflow condition exists occurs prior to completing the change of the value from the one data format to the another data format. Determining that the overflow condition exists prior to completing the change improves performance, reducing processing cycles.

Additionally, or alternatively, in one or more embodiments, the instruction further includes a condition code set control. Based on the condition code set control being set to a particular value, a condition code is provided based on executing the instruction. Use of the condition code set control with the overflow result control facilitates processing by enabling a number of converting operations performed by the instruction to change the value to be reduced when an overflow condition is detected and the condition code set control and overflow result control are set to a particular value and a selected value, respectively.

Additionally, or alternatively, in one or more embodiments, the computer operations further include executing the instruction another time. The executing the instruction the another time includes determining that the overflow condition exists in the change of another value from the one data format to the another data format, determining that the overflow result control of the instruction is set to another selected value, and providing another result of executing the instruction the another time. The providing the another result includes placing at least a portion of a result value of the change of the another value in the result location based on determining that the overflow condition exists and that the overflow result control is set to the another selected value. By providing the overflow result control, the use of the default value is controlled in that such use is selectable, facilitating processing and improving performance.

In accordance with one or more aspects, each of the embodiments is separable and optional from one another. Further, embodiments may be combined with one another.

In one or more aspects, a computer-implemented method is provided. The computer-implemented method includes executing an instruction configured to perform data conversion. The executing the instruction includes determining that an overflow condition exists in a change of a value, specified by the instruction, from one data format to another data format. It is determined that an overflow result control of the instruction is set to a selected value. A result of executing the instruction is provided. The providing the result includes placing a chosen default value in a result location based on determining that the overflow condition exists and that the overflow result control is set to the selected value. By placing a chosen default value in a result location based on determining that the overflow condition exists and that the overflow result control is set to the selected value enables a result to be provided for the instruction and allows the instruction to complete with a condition code even if the change of the value results in an overflow condition. The use of the overflow result control allows the overflow condition to be detected prior to completing the change and allows for a condition code to be provided. This increases processing speed by not requiring a complete conversion of the value even though the overflow condition is detected.

Additionally, or alternatively, in one or more embodiments, the value is included in at least one register specified by the instruction, the overflow result control is included in a mask field of the instruction and the result location is at least one register specified by the instruction. By using registers and a mask field of the instruction, instruction execution and processing speed are improved. Storage/memory requirements and latency access are reduced.

Additionally, or alternatively, in one or more embodiments, the determining that the overflow condition exists includes executing the instruction to perform up to a selected number of converting operations to change the value from the one data format to the another data format. The selected number of converting operations is dependent on a size of the result location. It is determined that one or more additional operations over the selected number of converting operations is to be performed to complete the change of the value from the one data format to the another data format. The determining that the one or more additional operations is to be performed signifies that the overflow condition exists. By determining that the additional operations are to be performed, absent performing the additional operations, processing speed is increased by not requiring a complete conversion of the value even though the overflow condition is detected.

Additionally, or alternatively, in one or more embodiments, the determining that the overflow condition exists occurs prior to completing the change of the value from the one data format to the another data format. Determining that the overflow condition exists prior to completing the change improves performance, reducing processing cycles.

Additionally, or alternatively, in one or more embodiments, the instruction further includes a condition code set control. Based on the condition code set control being set to a particular value, a condition code is provided based on executing the instruction. Use of the condition code set control with the overflow result control facilitates processing by enabling a number of converting operations performed by the instruction to change the value to be reduced when an overflow condition is detected and the condition code set control and overflow result control are set to a particular value and a selected value, respectively.

Additionally, or alternatively, in one or more embodiments, the computer operations further include executing the instruction another time. The executing the instruction the another time includes determining that the overflow condition exists in the change of another value from the one data format to the another data format, determining that the overflow result control of the instruction is set to another selected value, and providing another result of executing the instruction the another time. The providing the another result includes placing at least a portion of a result value of the change of the another value in the result location based on determining that the overflow condition exists and that the overflow result control is set to the another selected value. By providing the overflow result control, the use of the default value is controlled in that such use is selectable, facilitating processing and improving performance.

In accordance with one or more aspects, each of the embodiments is separable and optional from one another. Further, embodiments may be combined with one another.

In one or more aspects, a computer program product is provided. The computer program product includes a set of one or more computer-readable storage media, and program instructions, collectively stored in the set of one or more computer-readable storage media, for causing at least one computing device to perform computer operations including executing an instruction configured to perform data conversion. The executing the instruction includes determining that an overflow condition exists in a change of a value, specified by the instruction, from one data format to another data format. The one data format is a decimal data format and the another data format is a binary data format. A determination is made that an overflow result control of the instruction is set to a selected value. A result of executing the instruction is provided. The providing the result includes placing a chosen default value in a result location based on determining that the overflow condition exists and that the overflow result control is set to the selected value. The value is included in at least one register specified by the instruction, the overflow result control is included in a mask field of the instruction and the result location is at least one register specified by the instruction. By placing a chosen default value in a result location based on determining that the overflow condition exists and that the overflow result control is set to the selected value enables a result to be provided for the instruction and allows the instruction to complete with a condition code even if the change of the value results in an overflow condition. The use of the overflow result control allows the overflow condition to be detected prior to completing the change and allows for a condition code to be provided. This increases processing speed by not requiring a complete conversion of the value even though the overflow condition is detected. Conversion from decimal to binary is facilitated and improved, particularly in the event of an overflow condition, by streamlining the processing and eliminating converting operations based on detecting the overflow condition. By using registers and a mask field of the instruction, instruction execution and processing speed are improved. Storage/memory requirements and latency access are reduced.

In accordance with one or more aspects, each of the embodiments is separable and optional from one another. Further, embodiments may be combined with one another.

In one or more aspects, a computer program product is provided. The computer program product includes a set of one or more computer-readable storage media, and program instructions, collectively stored in the set of one or more computer-readable storage media, for causing at least one computing device to perform computer operations including executing an instruction configured to perform data conversion. The executing the instruction includes determining that an overflow condition exists in a change of a value, specified by the instruction, from one data format to another data format. The one data format is a decimal data format and the another data format is a binary data format. The determining that the overflow condition exists includes executing the instruction to perform up to a selected number of converting operations to change the value from the one data format to the another data format. The selected number of converting operations is dependent on a size of the result location. It is determined that one or more additional operations over the selected number of converting operations is to be performed to complete the change of the value from the one data format to the another data format. The determining that the one or more additional operations is to be performed signifies that the overflow condition exists. A determination is made that an overflow result control of the instruction is set to a selected value. A result of executing the instruction is provided. The providing the result includes placing a chosen default value in a result location based on determining that the overflow condition exists and that the overflow result control is set to the selected value. By placing a chosen default value in a result location based on determining that the overflow condition exists and that the overflow result control is set to the selected value enables a result to be provided for the instruction and allows the instruction to complete with a condition code even if the change of the value results in an overflow condition. The use of the overflow result control allows the overflow condition to be detected prior to completing the change and allows for a condition code to be provided. This increases processing speed by not requiring a complete conversion of the value even though the overflow condition is detected. Conversion from decimal to binary is facilitated and improved, particularly in the event of an overflow condition, by streamlining the processing and eliminating converting operations based on detecting the overflow condition. By determining that the additional operations are to be performed, absent performing the additional operations, processing speed is increased by not requiring a complete conversion of the value even though the overflow condition is detected.

In accordance with one or more aspects, each of the embodiments is separable and optional from one another. Further, embodiments may be combined with one another.

In one or more aspects, a computer program product is provided. The computer program product includes a set of one or more computer-readable storage media, and program instructions, collectively stored in the set of one or more computer-readable storage media, for causing at least one computing device to perform computer operations including executing an instruction configured to perform data conversion. The executing the instruction includes determining that an overflow condition exists in a change of a value, specified by the instruction, from one data format to another data format. The one data format is a decimal data format and the another data format is a binary data format. The determining that the overflow condition exists includes executing the instruction to perform up to a selected number of converting operations to change the value from the one data format to the another data format. The selected number of converting operations is dependent on a size of the result location. It is determined that one or more additional operations over the selected number of converting operations is to be performed to complete the change of the value from the one data format to the another data format. The determining that the one or more additional operations is to be performed signifies that the overflow condition exists. A determination is made that an overflow result control of the instruction is set to a selected value. A result of executing the instruction is provided. The providing the result includes placing a chosen default value in a result location based on determining that the overflow condition exists and that the overflow result control is set to the selected value. The value is included in at least one register specified by the instruction, the overflow result control is included in a mask field of the instruction and the result location is at least one register specified by the instruction. By placing a chosen default value in a result location based on determining that the overflow condition exists and that the overflow result control is set to the selected value enables a result to be provided for the instruction and allows the instruction to complete with a condition code even if the change of the value results in an overflow condition. The use of the overflow result control allows the overflow condition to be detected prior to completing the change and allows for a condition code to be provided. This increases processing speed by not requiring a complete conversion of the value even though the overflow condition is detected. Conversion from decimal to binary is facilitated and improved, particularly in the event of an overflow condition, by streamlining the processing and eliminating converting operations based on detecting the overflow condition. By using registers and a mask field of the instruction, instruction execution and processing speed are improved. Storage/memory requirements and latency access are reduced. By determining that the additional operations are to be performed, absent performing the additional operations, processing speed is increased by not requiring a complete conversion of the value even though the overflow condition is detected.

In accordance with one or more aspects, each of the embodiments is separable and optional from one another. Further, embodiments may be combined with one another.

In one or more aspects, a computer program product is provided. The computer program product includes a set of one or more computer-readable storage media, and program instructions, collectively stored in the set of one or more computer-readable storage media, for causing at least one computing device to perform computer operations including executing an instruction configured to perform data conversion. The executing the instruction includes determining that an overflow condition exists in a change of a value, specified by the instruction, from one data format to another data format. The one data format is a decimal data format and the another data format is a binary data format. A determination is made that an overflow result control of the instruction is set to a selected value. A result of executing the instruction is provided. The providing the result includes placing a chosen default value in a result location based on determining that the overflow condition exists and that the overflow result control is set to the selected value. The value is included in at least one register specified by the instruction, the overflow result control is included in a mask field of the instruction and the result location is at least one register specified by the instruction. The instruction further includes a condition code set control. Based on the condition code set control being set to a particular value, a condition code is provided based on executing the instruction. Use of the condition code set control with the overflow result control facilitates processing by enabling a number of converting operations performed by the instruction to change the value to be reduced when an overflow condition is detected and the condition code set control and overflow result control are set to a particular value and a selected value, respectively. By placing a chosen default value in a result location based on determining that the overflow condition exists and that the overflow result control is set to the selected value enables a result to be provided for the instruction and allows the instruction to complete with a condition code even if the change of the value results in an overflow condition. The use of the overflow result control allows the overflow condition to be detected prior to completing the change and allows for a condition code to be provided. This increases processing speed by not requiring a complete conversion of the value even though the overflow condition is detected. Conversion from decimal to binary is facilitated and improved, particularly in the event of an overflow condition, by streamlining the processing and eliminating converting operations based on detecting the overflow condition. By using registers and a mask field of the instruction, instruction execution and processing speed are improved. Storage/memory requirements and latency access are reduced.

In accordance with one or more aspects, each of the embodiments is separable and optional from one another. Further, embodiments may be combined with one another.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., performs overflow result control processing and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as overflow result control code 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101.

Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud computing services and/or microservices (not separately shown in FIG. 1): private and public clouds 106, 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above is only one example of a computing environment to incorporate, perform and/or use one or more aspects of the present disclosure. Other examples are possible. For instance, in one or more embodiments, one or more of the components/modules/blocks of FIG. 1 are not included in the computing environment and/or are not used for one or more aspects of the present disclosure. Further, in one or more embodiments, additional and/or other components/modules/blocks may be used. Other variations are possible.

In one example, a processor (e.g., of processor set 110) includes a plurality of functional components (or a subset thereof) used to execute instructions. As depicted in FIG. 2, in one example, a processor 200 includes, for instance, an instruction fetch component 201 to fetch instructions to be executed; an instruction decode/operand fetch component 202 to decode the fetched instructions and to obtain operands of the decoded instructions; one or more instruction execute components 204 to execute the decoded instructions; a memory access component 206 to access memory for instruction execution, if necessary; and a write back component 208 to provide the results of the executed instructions. One or more of the components may access and/or use one or more registers 210 in instruction processing. Further, one or more of the components may access and/or use overflow result control code 150. Additional, fewer and/or other components may be used in one or more aspects of the present disclosure.

In one example, overflow result control code (e.g., overflow result control code 150) is used, in accordance with one or more aspects of the present disclosure, to determine a result based on an overflow condition. Overflow result control code (e.g., overflow result control code 150)

includes code or instructions used to perform overflow result control processing, in accordance with one or more aspects of the present disclosure. The code is, e.g., computer-readable program code (e.g., instructions) in computer-readable media, e.g., storage (persistent storage 113, cache 121, storage 124, other storage, as examples). The computer-readable storage media may be part of one or more computer program products and the computer-readable program code may be executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the code and/or portions thereof. Many examples are possible.

One example of overflow result control code 150 is described with reference to FIG. 3A. In one example, overflow result control code 150 includes obtain instruction code 300 to obtain (e.g., receive, be provided, pull, retrieve, fetch, etc.) an instruction to be executed, such as a vector convert to binary instruction with an overflow result control (or other convert instruction), and execute instruction code 310 to be used to execute the instruction.

In one example, referring to FIG. 3B, execute instruction code 310 includes, for instance, obtain operands code 312 to obtain one or more operands and/or information of the instruction; and perform operations code 316 to perform one or more operations on data (e.g., change (e.g., convert) data from one data format (e.g., decimal) to another data format (e.g., binary), perform overflow result control processing, etc.).

Further details of perform operations code 316 are described with reference to FIG. 3C. For example, perform operations code 316 includes change code 320 to change data from one data format (e.g., decimal) to another data format (e.g., binary); overflow result code 322 to check for an overflow condition and determine the result based on an overflow result control; and a provide result code 324 to provide a result of the instruction.

In accordance with one or more aspects, an instruction that is obtained and executed is a vector convert to binary instruction. One particular example of a vector convert to binary instruction is described with reference to FIGS. 4A-4C. In one example, a vector convert to binary instruction, such as a Vector Convert to Binary instruction 400 (FIG. 4A), is a single architected hardware machine instruction at the hardware/software interface. As an example, it is part of an instruction set architecture. One example of an instruction set architecture to incorporate and/or use a vector convert to binary instruction, such as the Vector Convert to Binary instruction of FIG. 4A and/or other vector convert to binary instructions (and/or other convert instructions), and/or aspects of the present disclosure is the z/Architecture® instruction set architecture offered by International Business Machines Corporation, Armonk, New York. One embodiment of the z/Architecture instruction set architecture is described in a publication entitled, "z/Architecture Principles of Operation," IBM Publication No. SA22-7832-13, Fourteenth Edition, May 2022, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present disclosure. z/Architecture and IBM are trademarks or registered trademarks of International Business Machines Corporation in at least one jurisdiction.

In one example, the Vector Convert to Binary instruction is part of a vector facility of an instruction set architecture. The vector facility provides, for instance, fixed sized vectors ranging from, e.g., one to sixteen elements. Each vector includes data which is operated on by vector instructions defined in the facility. In one embodiment, if a vector is made up of multiple elements, then each element is processed in parallel with the other elements. Instruction completion does not occur, in one example, until processing of all the elements is complete. In other embodiments, the elements are processed partially in parallel and/or sequentially; and/or there may be additional elements.

In one embodiment, the vector instructions use vector registers that include the vectors. For instance, each vector register is, e.g., 128 bits in length and includes one to sixteen equal sized elements. If there are multiple elements in the register, the elements are indexed from left to right starting with element zero. In one example, the vector facility includes 32 vector registers, which are part of a register file. The register file is an array of processor registers in, e.g., a central processing unit (e.g., a processor of processor set 110; e.g., processor 200) that includes registers that may be used for instruction processing. In one example, the register file includes the vector registers (e.g., 32 vector registers) and other types of registers can map to a quadrant of the vector registers. For instance, sixteen floating point registers, which are 64 bits in length, can overlay the vector registers. Thus, as an example, when floating point register 2 is modified, then vector register 2 is also modified. Other mappings for other types of registers are also possible.

Vector data appears in storage in, for instance, a left-to-right sequence, similar to other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

Figure 4A:
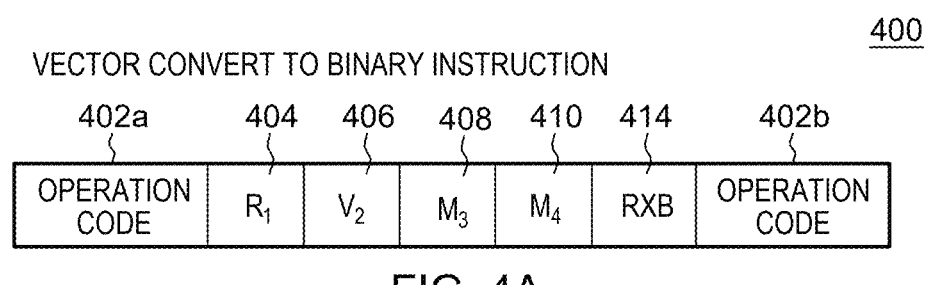
FIG. 4A depicts one example of a format of a Vector Convert to Binary instruction, in accordance with one or more aspects of the present disclosure.
Figure 4B:
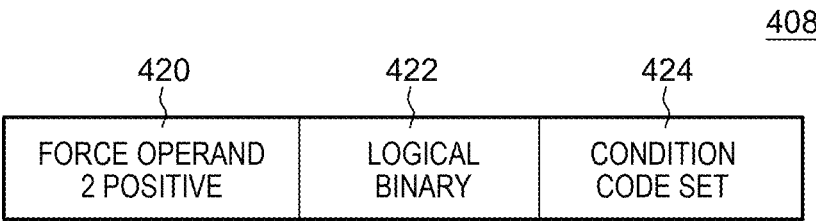
FIG. 4B depicts one example of controls of a mask operand of the Vector Convert to Binary instruction of FIG. 4A, in accordance with one or more aspects of the present disclosure.

Referring to FIG. 4A, in one particular example, Vector Convert to Binary instruction 400 has a vector register and register operation with an extended opcode format. Vector Convert to Binary instruction 400 includes a plurality of fields, including one or more operation code (opcode) fields 402a (e.g., bits 0-7), 402b (e.g., bits 40-47) that indicate that this is a vector convert to binary operation; a first operand field ($R_1$) 404 (e.g., bits 8-11) used to designate a first operand location (e.g., one or more general registers); a second operand field ($V_2$) 406 (e.g., bits 12-15) used to designate a second operand location (e.g., one or more vector registers); a mask field ($M_3$) 408 (e.g., bits 16-23) including one or more controls to be used during execution of the instruction; another mask field ($M_4$) 410 (e.g., bits 24-27) that includes one or more other controls to be used during execution of the instruction; and a register extension bit (RXB) field 414 (e.g., bits 36-39) to be used, in one example, with a vector register designated operand field (e.g., $V_2$) to designate a location (e.g., vector register(s)) used by the instruction, as described below.

In one example, register extension bit (RXB) field 414 includes the most significant bit for a vector register designated operand. Bits for register designations not specified by the instruction are to be reserved and set to zero. The most significant bit is concatenated, for instance, to the left of a four-bit register designation of the vector register field (e.g., $V_2$) to create a five-bit vector register designation.

In one example, the RXB field includes four bits (e.g., bits 0-3), and the bits are defined, as follows:

0—Most significant bit for the vector register designation in, e.g., bits 8-11 of the instruction, if any.
   1—Most significant bit for the vector register designation in, e.g., bits 12-15 of the instruction, if any.
   2—Most significant bit for the vector register designation in, e.g., bits 16-19 of the instruction, if any.
   3—Most significant bit for the vector register designation in, e.g., bits 32-35 of the instruction, if any.

Each bit is set to zero or one by, for instance, the assembler depending on the register number. For instance, for registers 0-15, the bit is set to 0; for registers 16-31, the bit is set to 1, etc. Thus, a register containing an operand is specified using, for instance, a four-bit field of the register field with the addition of its corresponding register extension bit (RXB) as the most significant bit. For instance, if the four-bit field is 0110 and the extension bit is 0, then the five bit field 00110 indicates register number 6. In a further embodiment, the RXB field includes additional bits, and more than one bit is used as an extension for each vector or location. Further, in other embodiments, the assignment of RXB bits to operands and/or bits of the instruction format may be different than the examples herein. Other variations are possible.

Although in this example there are a plurality of opcode fields 402a, 402b, in other examples, there may be one opcode field. For instance, there may be one opcode field at the beginning of the instruction format. Other examples are also possible. Further, one or more fields of a vector convert to binary instruction, such as Vector Convert to Binary instruction 400, may be optional. As an example, RXB field 414 may be optional. For instance, a vector convert to binary instruction, such as Vector Convert to Binary instruction 400, may not have an RXB field. Instead, each vector register designated operand field includes an indication of the vector register. Many variations are possible.

In one example, there may be multiple versions of the Vector Convert to Binary instruction, and each version has a different operation code (opcode). For instance, one version has a mnemonic VCVB, a selected operation code indicating the VCVB version, and a result that is, e.g., a 32-bit value (e.g., 32-bit signed binary integer), and another version has a mnemonic VCVBG, a different selected operation code indicating the VCVBG version, and a result that is, e.g., a 64-bit value (e.g., a 64-bit signed binary integer). Other examples are possible including, but not limited to, additional, fewer and/or other versions, operation codes, result sizes, etc.

The description herein applies to both the VCVB and VCVBG versions unless otherwise specified.

Further details relating to one or more of the fields of the instruction are described below. For example, mask field ($M_3$) 408 includes the third operand of the instruction, and referring to FIG. 4B, includes the following controls, in one example:

Force Operand 2 Positive 420 (e.g., bit 0): In one example, when force operand 2 positive 420 is, e.g., one, the second operand sign is treated as a positive sign and is not checked for validity. When force operand 2 positive 420 is, e.g., zero, the second operand sign is checked for validity, and is used in the operation if the logical binary control (described below) is, e.g., zero. Other examples and/or variations are possible.

In one example, bit 1 of mask field 408 is ignored and is to contain, e.g., a zero. Otherwise, the program may not operate compatibly in the future, in one example.

Logical Binary 422 (e.g., bit 2): In one example, when logical binary 422 is, e.g., one, the first operand result is an unsigned binary integer, which is considered positive. When logical binary 422 is, e.g., zero, the first operand result is a signed binary integer. When logical binary 422 is, e.g., one and force operand 2 positive 420 is, e.g., zero, the sign code of the second operand is checked for validity but is treated as a positive sign code in the conversion. Other examples and/or variations are possible.

Condition Code Set 424 (e.g., bit 3): In one example, when condition code set 424 is, e.g., zero, the condition code is not set and remains unchanged. When condition code set 424 is, e.g., one, the condition code is set as specified in the resulting condition codes, described below.

Figure 4C:
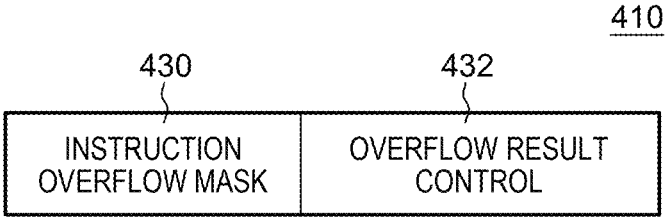
FIG. 4C depicts one example of controls of another mask operand of the Vector Convert to Binary instruction of FIG. 4A, in accordance with one or more aspects of the present disclosure.

In one example, mask field ($M_4$) 410 includes the fourth operand of the instruction, and referring to FIG. 4C, includes the following controls, in one example:

Instruction Overflow Mask 430 (e.g., bit 0): In one example, when, e.g., a vector-packed-decimal-enhancement facility 1 is not installed, bit 0 of mask field 410 is reserved and is to contain, e.g., zero; otherwise, the program may not operate compatibly in the future, in one example. When, e.g., the vector-packed-decimal-enhancement facility 1 is installed, bit 0 is an instruction overflow mask. When instruction overflow mask 430 is, e.g., one, recognition of a fixed-point overflow program interrupt is suppressed, in one example. Other examples and/or variations are possible.

Overflow Result Control 432 (e.g., bit 1): In one example, when, e.g., a vector-packed-decimal-enhancement facility 3 is not installed, bit 1 is reserved and is to contain, e.g., zero; otherwise, the program may not operate compatibly in the future, in one example. When, e.g., the vector-packed-decimal-enhancement facility 3 is installed, bit 1 is an overflow result control. When overflow occurs and the overflow result control is, e.g., zero, a selected portion of the result (e.g., the rightmost 32 bits of the binary result for VCVB, and the rightmost 64 bits of the binary result for VCVBG) is placed in a selected result location (e.g., the appropriate bit positions of general register $R_1$; e.g., the rightmost 32 bits of the result location for VCVB, and the rightmost 64 bits of the result location for VCVBG). When overflow occurs and overflow result control 432 is, e.g., one, a chosen default value (e.g., a selected number of zeros) is placed in the selected result location (e.g., the appropriate bit positions of general register $R_1$; e.g., the rightmost 32 bits of the result location for VCVB, and the rightmost 64 bits of the result location for VCVBG).

In one example, bits 2-3 are ignored and are to contain, e.g., zeros. Otherwise, the program may not operate compatibly in the future, in one example.

In one example, when condition code set 424 is, e.g., one, the condition code resulting from execution of the instruction is set as follows: 0—No overflow; 1—; 2—; 3—Overflow. In one example, when condition code set 424 is, e.g., zero, the condition code remains unchanged. Other examples and/or variations are possible.

Example program exceptions that may occur during execution of the instruction include data with DXC (data exception code) FE, vector instruction; data with DXC (data exception code) 00, general operand; fixed-point overflow; operation (if, e.g., the vector packed decimal facility for z/Architecture is not installed); transaction constraint; etc. Additional, fewer and/or other program exceptions may occur in other embodiments and/or for other architectures.

Although in the above examples reference is made as to whether a vector-packed-decimal-enhancement facility is installed, in other examples, such a reference or check is not made. Many examples are possible.

In execution of Vector Convert to Binary instruction 400, in one example, the second operand (included in one or more registers specified by $V_2$) is changed from decimal to binary, and the result is placed at the first operand location (e.g., one or more registers specified by $R_1$; also referred to as a result location). The second operand is in, e.g., a vector register, and the first operand is in, e.g., a general register. However, other examples and/or variations are possible.

In one example, the second operand has the data format of a signed packed decimal data. To convert a value from a decimal data type, such as a packed decimal data type, to a binary data type, the following technique is performed, in one example: the decimal value represented by the signed packed decimal data format is divided by two providing a quotient and a remainder. If the remainder is a zero, a binary 0 is placed in a result location (e.g., a register or memory having a plurality of bit positions) in the rightmost bit; otherwise, a binary 1 is placed in the result location in the rightmost bit of the result location. The quotient is then divided by 2 providing a new quotient and remainder. If the remainder is a zero, a binary 0 is placed in the result location in a next rightmost bit; otherwise, a binary 1 is placed in the result location in the next rightmost bit. This is repeated until the quotient is zero. For instance, a decimal value of 24 is divided by 2 providing a quotient of 12 and a remainder of 0. Therefore, a binary 0 is placed in the rightmost bit of a result location (e.g., Sxxxx0, where S is defined as a sign). Further, quotient 12 is divided by 2 providing a new quotient of 6 and a remainder of 0; therefore, 0 is placed in the next rightmost position (e.g., Sxxx00). The steps are repeated for the quotient of 6 providing a new quotient of 3 and a remainder of 0; therefore, 0 is placed in the next rightmost position (e.g., Sxx000). Again, a quotient of 3 is divided by 2 now providing a quotient of 1 and a remainder of 1; therefore, 1 is placed in the next rightmost position (e.g., Sx1000). A quotient of 1 is divided by 2 providing a quotient of 0 and a remainder of 1; therefore, 1 is placed in the next rightmost position (e.g., S11000). Since the quotient is now zero, the dividing is complete and the binary equivalent of 24 in decimal is 11000. A sign may be represented in binary (e.g., 0 for positive, 1 for negative) and placed in the leftmost bit of the result location, as an example (e.g., 011000).

In one example, in execution of the Vector Convert to Binary instruction, the sign of the second operand may be modified for use before conversion by the force operand 2 positive control (e.g., force operand 2 positive 420) or the logical binary control (e.g., logical binary 422). The digit codes (e.g., all digit codes) of the second operand are checked for validity, in one example. The sign code of the second operand is checked for validity, in one example, unless overridden by the force operand 2 positive control. Other variations are possible.

In one example, for the VCVB version of the Vector Convert to Binary instruction, when the logical binary control (e.g., logical binary 422) is, e.g., zero, the result of the conversion is, e.g., a 32-bit signed binary integer, which is placed in a selected result location (e.g., bit positions 32-63 of general register $R_1$). Bits 0-31 of general register $R_1$ remain unchanged. The maximum positive number that can be converted and still be contained in 32-bit positions is 2,147,483,647; the maximum negative number (the negative number with the greatest absolute value) that can be converted is −2,147,483,648. Other examples are possible including, but not limited to, other result sizes and/or number of bit positions.

In one example, for the VCVB version of the Vector Convert to Binary instruction, when the logical binary control (e.g., logical binary 422) is, e.g., one, the second operand sign is treated as a positive sign, and the result of the conversion is, e.g., a 32-bit unsigned binary integer, which is placed in a selected result location (e.g., bit positions 32-63 of general register $R_1$). Bits 0-31 of general register $R_1$ remain unchanged. The maximum number that can be converted and still be contained in 32 bit positions is 4,294,967,295. Other examples are possible including, but not limited to, other result sizes and/or number of bit positions.

In one example, for the VCVBG version of the Vector Convert to Binary instruction, when the logical binary control (e.g., logical binary 422) is, e.g., zero, the result of the conversion is, e.g., a 64-bit signed binary integer, which is placed in a selected result location (e.g., bit positions 0-63 of general register $R_1$). The maximum positive number that can be converted and still be contained in a 64-bit register is 9,223,372,036,854,775,807; the maximum negative number (the negative number with the greatest absolute value) that can be converted is −9,223,372,036,854,775,808. Other examples are possible including, but not limited to, other result sizes and/or number of bit positions.

In one example, for the VCVBG version of the Vector Convert to Binary instruction, when the logical binary control (e.g., logical binary 422) is, e.g., one, the second operand sign is treated as a positive sign, and the result of the conversion is, e.g., a 64-bit unsigned binary integer, which is placed in a selected location (e.g., bit positions 0-63 of general register $R_1$). The maximum positive number that can be converted and still be contained in a 64-bit register is 18,446,744,073,709,551,615. Other examples are possible including, but not limited to, other result sizes and/or number of bit positions.

In one example, for a decimal number outside the maximum ranges (overflow case) defined for VCVB and VCVBG, the following occurs:

When, e.g., the vector packed decimal enhancement facility 3 is not installed or the overflow result control is, e.g., zero, a selected portion of the binary result (e.g., the rightmost 32 bits of the binary result) is placed in a result location (e.g., bit positions 32-63 of general register $R_1$) for VCVB, and a selected portion of the binary result (e.g., the rightmost 64 bits of the binary result) is placed in a result location (e.g., bit positions 0-63 of general register $R_1$) for VCVBG.

When the vector packed decimal enhancement facility 3 is installed and the overflow result control is, e.g., one, a chosen default value (e.g., a selected number of zeros) is placed in a result location (e.g., bit positions 32-63 of general register $R_1$) for VCVB, and a chosen default value (e.g., a selected number of zeros) is placed in a result location (e.g., bit positions 0-63 of general register $R_1$) for VCVBG. Other examples are possible including other bit positions, other locations and/or other chosen default values.

In one example, a selected condition code (e.g., condition code 3) is optionally set depending on the value of the condition code set control.

In one example, if a fixed-point overflow mask (in, e.g., a control register or data, such as a program status word) is, e.g., one and the instruction overflow mask (e.g., instruction overflow mask 430) is, e.g., zero, a program interruption for fixed-point overflow occurs.

In one or more aspects, when the second operand is negative and the logical binary control is, e.g., zero, the result is in two's-complement notation. In the overflow case, the operation is completed and results in a program interrupt for fixed-point overflow if the fixed-point overflow mask is, e.g., one. Other examples and/or variations are possible.

In the description herein of a vector convert to binary instruction, such as Vector Convert to Binary instruction 400, specific locations, specific fields and/or specific sizes of the fields may be indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

In one embodiment, the fields of the instruction are separate and independent from one another; however, in other embodiments, more than one field may be combined. Further, although example types of registers are specified for the source field (e.g., $V_2$) and the target field (e.g., $R_1$), other types of registers may be used. For instance, the source field and/or the target field, in other embodiments, may specify other than vector registers or general registers, respectively. Other examples are possible.

A vector convert to binary instruction, such as Vector Convert to Binary instruction 400, may have additional, fewer and/or other fields. Further, although various examples are provided for one or more formats of the instruction, additional and/or other formats may be used. Further, the processing may be used for other purposes than described herein.

One embodiment of using a vector convert to binary instruction (e.g., Vector Convert to Binary instruction 400) to perform a convert operation and overflow result control processing is further described with reference to FIGS. 5A-5B. In one example, an overflow result control process 500 uses code (e.g., code 300, 310-316, 320-324) to perform the processing and the process is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the processing and/or aspects thereof. Many examples are possible.

Figure 5A:
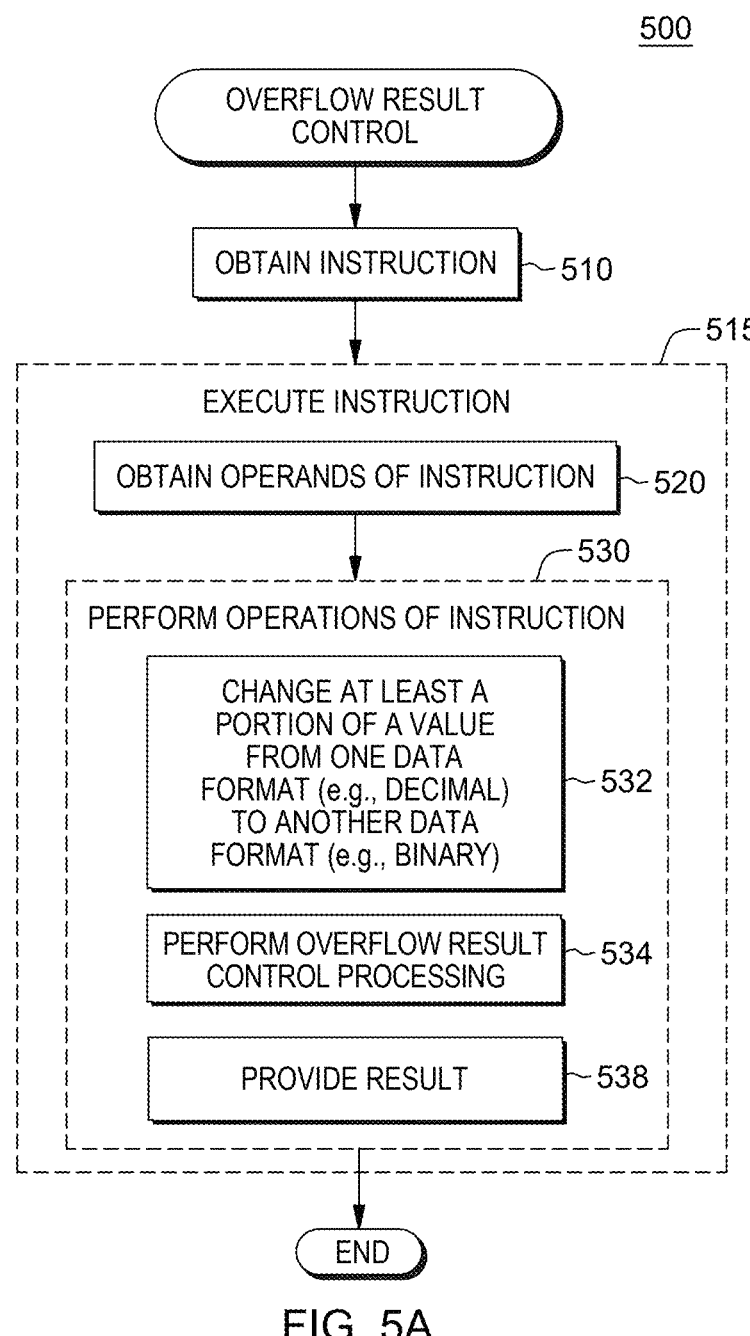
FIG. 5A depicts one example of overflow result control processing, in accordance with one or more aspects of the present disclosure.
Figure 5B:
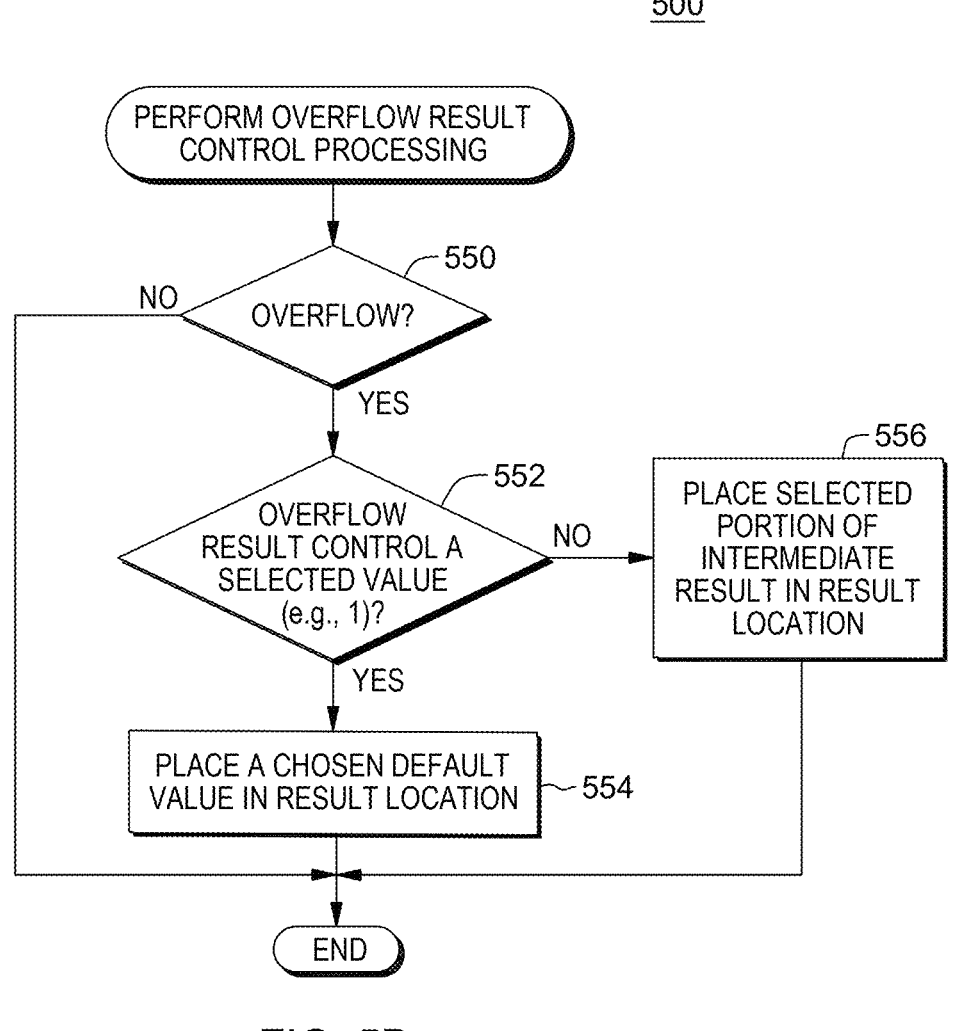
FIG. 5B depicts one example of perform overflow result control processing, in accordance with one or more aspects of the present disclosure.

Referring to FIG. 5A, in one example, overflow result control process 500 (also referred to as process 500) obtains 510 (e.g., receives, retrieves, fetches, is provided, pulls, etc.) an instruction (e.g., a vector convert to binary instruction) using, e.g., obtain instruction code 300, and executes 515 the instruction using, e.g., execute instruction code 310. Execution of the vector convert to binary instruction (e.g., Vector Convert to Binary instruction 400) includes, for instance, obtaining 520 one or more operands and/or information of the instruction (e.g., using obtain operands code 312). As examples, process 500 obtains a source value (e.g., a decimal number in a signed-packed decimal data format) from a second operand location (e.g., one or more vector registers specified using $V_2$ 406 and RXB 414), and one or more controls from one or more operands of the instruction (e.g., the third and fourth operands obtained from $M_3$ 408 and $M_4$ 410, respectively). Further, in one or more embodiments, additional, fewer and/or other operands and/or information may be obtained and/or used. The operands and/or information to be obtained depend, for instance, on which operands and/or information are specified using the instruction and/or are being used. For an instruction, one or more operands and/or information may be optional and may not be used in various embodiments. Many variations are possible.

Based on obtaining the operands, in one example, process 500 performs 530 a plurality of operations of the instruction (e.g., using perform operations code 316). As an example, process 500 changes 532 at least a portion of a value (e.g., at least a portion of the second operand of the instruction located in a selected location (e.g., one or more vector registers specified using $V_2$) from one data format to another data format. As an example, the one data format is decimal, such as a signed packed decimal format, and the other data format is binary.

Further, in one example, process 500 performs 534 overflow result control processing. For instance, as described in FIG. 5B, process 500 determines 550 if an overflow condition exists based on the changing the at least a portion of the value from the one data format (e.g., decimal, such as sign packed decimal) to the other data format (e.g., binary). In one example, up to a selected number of converting operations is performed on the value. The selected number is based, e.g., on the size of the result location and whether a sign is to be included in the result. For instance, if the size of the result location is 32-bit positions and a sign is to be included, then the selected number of converting operations is 31; if the size of the result location is 64-bit positions and a sign is to be included, then the selected number of converting operations is 63; and so on. If the change is not complete after performing the selected number of converting operations, then, in one example, an overflow condition exists.

To further explain, assume the value 24 is to be changed from a decimal data format to a binary data format and the result location has a size of 5 positions, in which the 5th position (e.g., the leftmost position) is for the sign (e.g., 0 for positive, 1 for negative). Thus, the change is to take 4 or less converting operations to fit within the result location. Therefore, the selected number of converting operations is 4.

To change the decimal value of 24 to binary, the following converting operations are performed, in one example:

Converting Operation 1: 24 is divided by 2 providing a quotient of 12 and a remainder of 0. Therefore, a binary 0 is placed in the rightmost bit of the 5-bit result location (e.g., Sxxx0, where S is the sign (e.g., 0 for positive)).

Converting Operation 2: The quotient 12 is divided by 2 providing a new quotient of 6 and a remainder of 0. Therefore, 0 is placed in the next rightmost position (e.g., Sxx00).

Converting Operation 3: The quotient of 6 is divided by 2 providing a new quotient of 3 and a remainder of 0. Therefore, 0 is placed in the next rightmost position (e.g., Sx000).

Converting Operation 4: The quotient of 3 is divided by 2 now providing a quotient of 1 and a remainder of 1; therefore, 1 is placed in the next rightmost position (e.g., S1000).

At this point, the result location has no further bit positions to be filled but there still remains a quotient (e.g., a quotient of 1). Therefore, an overflow condition exists.

Although the result location in this example is 5-bit positions, the same principles apply to result locations of larger sizes and/or other sizes. The use of a smaller size result location was for demonstration purposes only.

Based on determining an overflow condition exists, in accordance with one or more aspects, process 500 checks 552 an overflow result control (e.g., overflow result control 432) specified by the instruction. If the overflow result control is set to a selected value (e.g., 1), then process 500 places 554 a chosen default value (e.g., one or more zeros) in at least a portion of the result location (e.g., selected positions of a result register; e.g., 32 or 64 rightmost bit positions of the result register, depending on instruction version). In one example, this occurs based on determining the overflow condition and prior to completing the change of the value from the one data format to the other data format, saving processing cycles.

However, if the overflow result control is not set to the selected value but is set to another selected value (e.g., zero), process 500 places 556 a selected portion of the intermediate result (e.g., a selected portion of the result of the change, such as rightmost 32 or 64-bit positions of the binary result, depending on instruction version) in the result location (e.g., selected positions of a result register; e.g., 32 or 64 rightmost bit positions of the result register, depending on instruction version). In one example, to obtain the correct rightmost 32 or 64 bits of the result, the change is to be performed to completion. In one example, this includes re-executing the instruction to perform the change to completion and obtaining the correct binary result. Other examples are possible including, but not limited to, using the rightmost 32 or 64 bits of the change without completing the change with an understanding that those bits may be incorrect.

Returning to query 550, if process 500 does not detect an overflow condition, then the perform overflow result control processing is complete. In one example, an overflow condition does not exist if all of the converted binary digits fit within the result location. For instance, using the example above in which the value of 24 is being converted, if, in this instance, the result location is 6 positions, instead of 5, in which the 6th position (e.g., the leftmost position) is the sign position, then there is enough space for the binary result of 24.

Again, in one example, to determine whether an overflow condition exists, up to a selected number of converting operations is performed on the value. The selected number is based, e.g., on the size of the result location and whether a sign is to be included in the result. Since in this example, the size of the result location is 6 positions, the change is to take 5 or less converting operations to fit within the result location. Therefore, the selected number of converting operations is 5.

In one example, as described herein, to change the decimal value of 24 to binary, the following converting operations are performed, in one example:

Converting Operation 1: 24 is divided by 2 providing a quotient of 12 and a remainder of 0. Therefore, a binary 0 is placed in the rightmost bit of the 6-bit result location (e.g., Sxxxx0, where S is the sign (e.g., 0 for positive)).

Converting Operation 2: The quotient 12 is divided by 2 providing a new quotient of 6 and a remainder of 0. Therefore, 0 is placed in the next rightmost position (e.g., Sxxx00).

Converting Operation 3: The quotient of 6 is divided by 2 providing a new quotient of 3 and a remainder of 0. Therefore, 0 is placed in the next rightmost position (e.g., Sxx000).

Converting Operation 4: The quotient of 3 is divided by 2 now providing a quotient of 1 and a remainder of 1; therefore, 1 is placed in the next rightmost position (e.g., Sx1000).

Converting Operation 5: The quotient of 1 is divided by 2 now providing a quotient of 0 and a remainder of 1; therefore, 1 is placed in the next rightmost position (e.g., S11000).

In this example, since the quotient is 0, no further converting operations are to be performed. Thus, the value of 24 was changed from decimal to binary in up to 5 converting operations, and therefore, no overflow condition exists.

Returning to FIG. 5A, based on changing the value and/or performing the overflow result control processing, process 500 provides 538 the result. The result is in, for instance, one or more registers specified by the instruction (e.g., specified by $R_1$). The result includes, for instance, the changed value, if there is no overflow condition; or a determined value, if there is an overflow condition. For instance, the determined value is a chosen default value (e.g., one or more zeros, such as 32 or 64 zeros, depending on the instruction version) if there is an overflow condition and the overflow result control is set to the selected value (e.g., 1); or, e.g., a selected number of rightmost bits of the converted value (e.g., 32 or 64-rightmost bits of the binary result) if there is an overflow condition and the overflow result control is set to another selected value (e.g., zero). Many examples and/or variations are possible.

The result may be used in further processing, such as in computations, etc., performed by other instructions or code of computer applications, in communication processing within and/or between computing devices, to perform certain tasks that are easier to perform in binary, etc. A result indicating an overflow condition may be used in further exception processing. Many examples exist.

In one specific use example involving PL/I, there is a PL/I language feature called an 'ON statement' that has a capability for the programmer to designate an 'ON-unit' block of code. This 'ON-unit' code is used to specify recovery actions for many, usually exceptional, conditions. These exceptional conditions include, for instance, overflow, fixed overflow and zero-divide.

PL/I uses various packed and zoned decimal data types, as well as binary integer types. Converting between these user types (e.g., in reaction to a user move/copy statement or to satisfy an application binary interface or an application programming interface) is a common operation, which may cause an exception condition, such as an overflow condition.

When a user has specified an ON statement that applies to these packed→binary conversion statements, as an example, the compiler generates a form of the conversion instruction where the condition code is set, and additional code is used to test this condition code. When overflow is indicated, the compiler directs the control flow to exception handling code/behavior specified by the programmer using the ON statement. In this 'ON statement' handling there is no requirement to see any of the actual/partial converted value so a fixed default result value to set on overflow is acceptable. The new overflow result control (ORC) can now be set, in addition to the condition code flag, to achieve the best convert to binary performance as well as satisfying the functional 'ON statement' behavior. Other examples are possible.

Described above is an enhanced vector convert to binary instruction that changes a value from one data format to another data format and/or performs overflow condition processing based on an overflow result control specified by the instruction.

In one or more examples, a selected number of the rightmost bits of the intermediate result (e.g., a result of the converting) is provided in case of an overflow. However, in one example, to obtain the rightmost bits of the intermediate result, all input digits are to be converted. The latency for the conversion of all input digits is a determined number of cycles, e.g., approximately 16 cycles. To reduce the latency, a short-cut may be taken in which only the digits relevant for the non-overflow case are speculatively converted, with an additional penalty for the overflow case. For instance, if the leading digits are zero, then those digits are not converted. As another example, only up to a selected number of converting operations is performed, which is dependent, e.g., on the size of the result location and/or whether a sign is to be included. Other examples are possible.

However, certain programming languages, such as PL/I are not able or choose not to utilize the short-cut since, in one example, PL/I does not recognize a fixed-point overflow exception produced by the vector convert to binary instructions; instead, PL/I uses a condition code to detect the overflow. In one or more aspects, the short-cut is not taken in certain situations, such as the condition code control being set to a selected value, such as one.

Figure 6B:
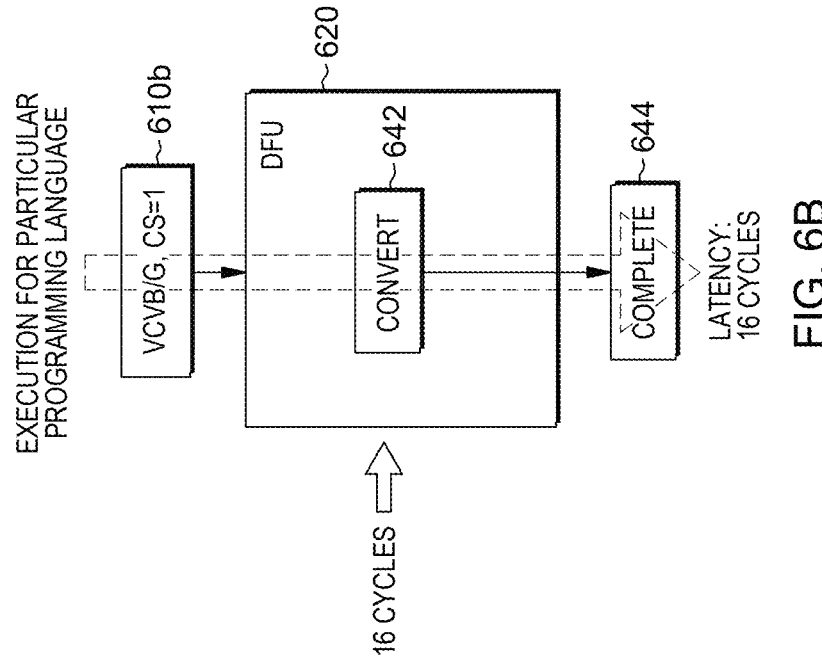
FIG. 6B depicts another example of an execution flow of the Vector Convert to Binary instruction of FIG. 4A.
Figure 6A:
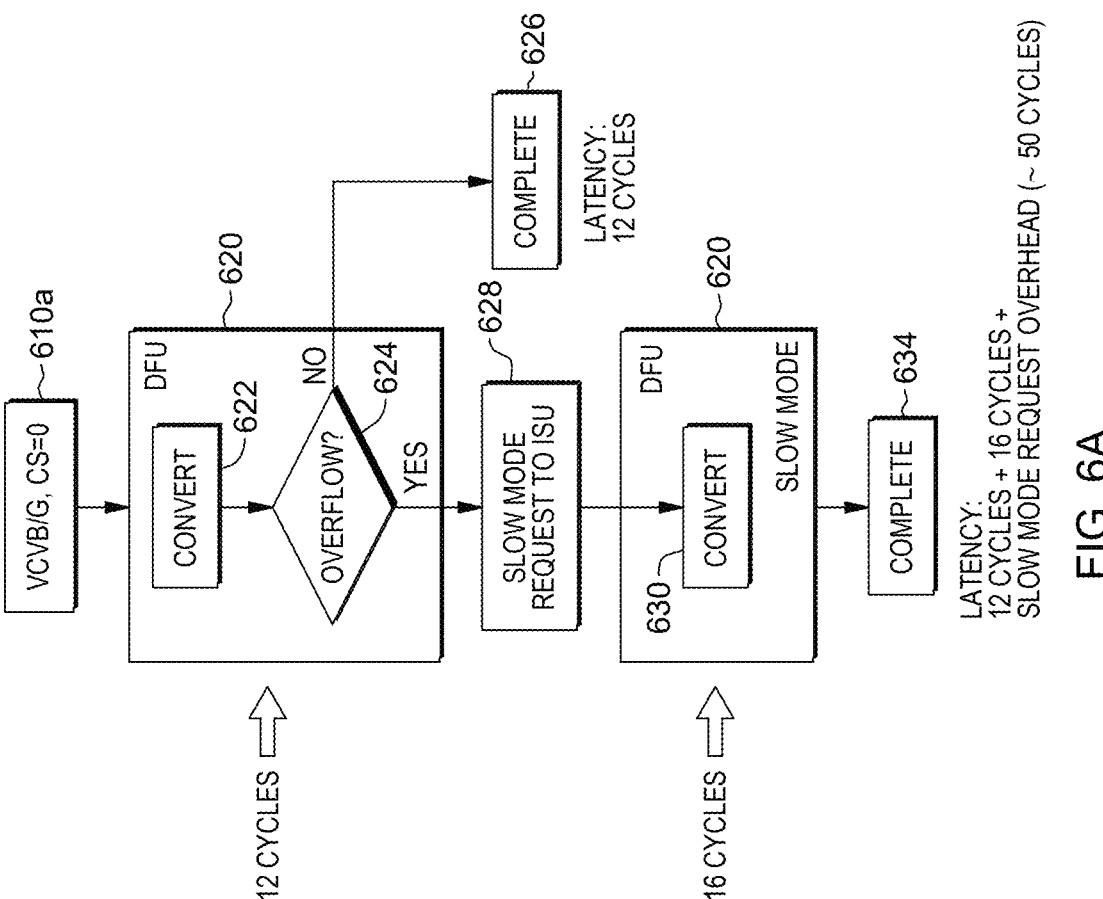
FIG. 6A depicts one example of an execution flow of the Vector Convert to Binary instruction of FIG. 4A.

Example latency of previous vector convert to binary instructions is depicted in FIGS. 6A-6B. As shown, in one example, a vector convert to binary instruction, such as a Vector Convert to Binary instruction 610a (e.g., VCVB, VCVBG) with a condition code set control set to another selected value, e.g., zero (CS=0) is obtained by, e.g., a decimal floating-point unit (DFU) 620 of, e.g., one or more computing devices. Decimal floating-point unit 620 executes instruction 610a to convert 622 at least a portion of a value (e.g., selected input digits) from one data format to another data format. Further, decimal floating-point unit 620 determines 624 whether an overflow condition occurred based on the converting. In one example, this takes approximately 12 cycles (other examples are possible).

If decimal floating-point unit 620 does not detect an overflow condition, then the conversion process is complete 626 (source value converted) and the latency is the same as the conversion latency (e.g., approximately 12 cycles or other number of cycles). However, if decimal floating-point unit 620 does detect an overflow condition, then a slow mode request 628 is sent to, e.g., an instruction sequencing unit. The instruction sequencing unit, as an example, re-issues convert instruction 610a to, e.g., decimal floating-point unit 620 with an indication that the instruction is to be executed in slow-mode (e.g., no short-cut, perform complete conversion of value). Decimal floating-point unit 620 executes instruction 610a to convert 630 a value (e.g., input digits) from one data format to another data format in slow mode. This takes, e.g., approximately 16 cycles (or another number of cycles). When the conversion is complete 634, the latency is equal to the latency of the first convert (e.g., approximately 12 cycles) plus the latency of the second convert (e.g., approximately 16 cycles) plus the slow mode request overhead, which is about 50 cycles (or another number of cycles). Other examples are possible.

Some programming languages, such as PL/I, are unable or choose not to use the short-cut (e.g., convert only a specified number of digits, such as the relevant digits), and thus, in one example, the entire value is converted. In one example, the condition code set control is set to a selected value (e.g., 1) to obtain a condition code from execution of the instruction. The condition code is then checked to determine if an overflow condition occurred based on the converting. In such a situation, as depicted in FIG. 6B, a vector convert to binary instruction, such as a Vector Convert to Binary instruction 610b (e.g., VCVB or VCVBG) with a condition code set control set to a selected value, e.g., one (CS=1) is obtained by, e.g., a decimal floating-point unit (DFU) 620 of, e.g., one or more computing devices. Decimal floating-point unit 620 executes instruction 610b to convert 642 a value (e.g., input digits) from one data format to another data format. This takes, e.g., approximately 16 cycles (or another number of cycles). When the conversion is complete 644, the latency is equal to e.g., approximately 16 cycles (or another number of cycles). Other examples are possible.

As described, in one or more examples, the state-of-the art definitions of current vector convert to binary instructions indicate that a certain number of the rightmost bits of the intermediate result is provided in the case of an overflow. Thus, in one example, all input digits are converted to correctly obtain the rightmost result bits. This uses additional latency. Thus, in some situations, a short-cut is speculatively performed in which only the digits relevant for the non-overflow case are converted with an additional penalty for the overflow case, if it is presented by the fixed-point overflow exception. However, certain programming languages, such as PL/I, cannot or choose not to utilize this short-cut since PL/I does not recognize, e.g., the fixed-point overflow exception. PL/I uses a condition code (provided as a result of completing an instruction) to detect the overflow. Thus, the short-cut is not taken if a particular control, the condition code set control, is set on (e.g., set to one).

In one or more examples, it is observed that in an overflow case, the result is not used by the program (e.g., PL/I program). Thus, in one or more aspects, the vector convert to binary instruction is augmented with an instruction text control bit, the overflow result control, to deliver a chosen default value (e.g., a selected number of zeros) as a result of the overflow case, if the control is set to a selected value (e.g., one). This augmentation of the architecture definition and processor implementation of the vector convert to binary instruction leads to a reduction in latency and improves the performance of a vector convert to binary instruction.

In accordance with one or more aspects, programming languages that previously could not or chose not to utilize the short-cut may now use and benefit from the short-cut in specified situations (e.g., the condition code set control is set to the selected value (e.g., 1) and the overflow result control of one or more aspects of the present disclosure is set to a selected value (e.g., 1). An example of this processing is described with reference to FIGS. 7A-7B.

Figure 7B:
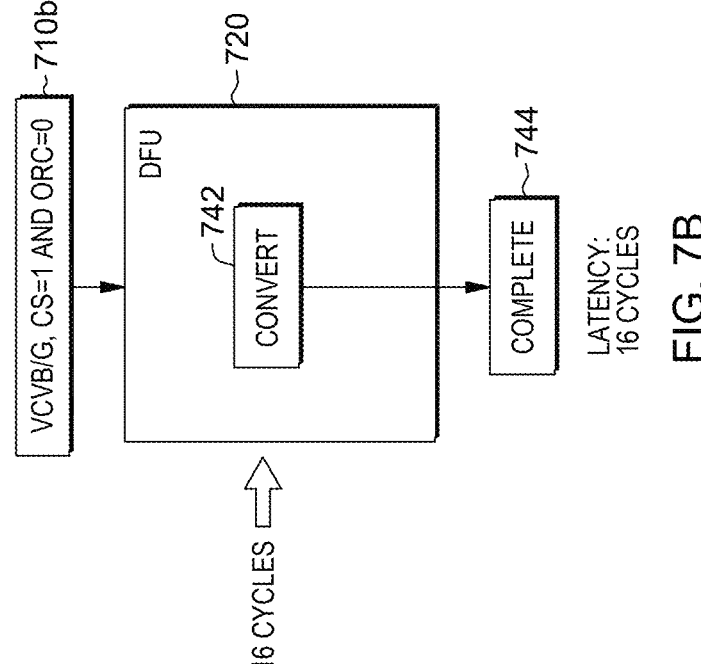
FIG. 7B depicts another example of an execution flow of the Vector Convert to Binary instruction of FIG. 4A, in accordance with one or more aspects of the present disclosure.
Figure 7A:
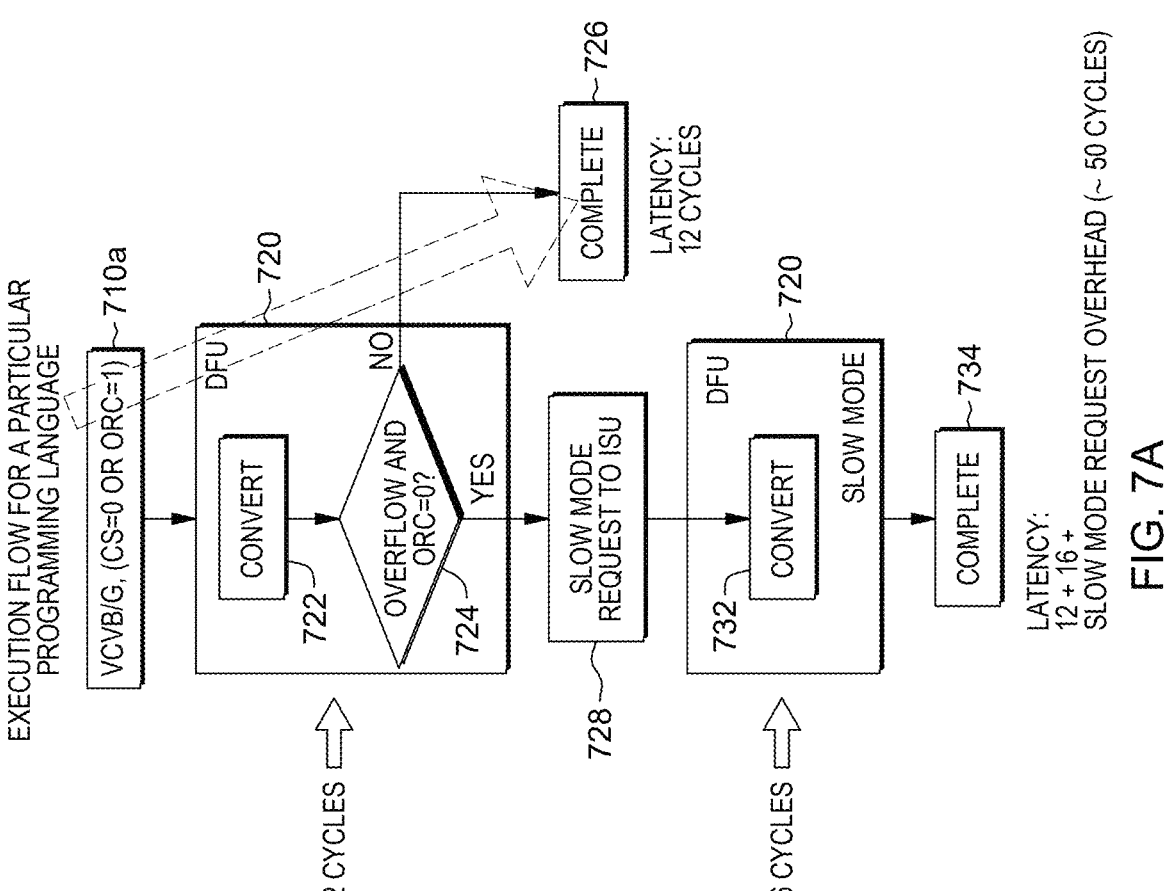
FIG. 7A depicts one example of an execution flow of the Vector Convert to Binary instruction of FIG. 4A, in accordance with one or more aspects of the present disclosure.

As shown in FIG. 7A, in one example, a vector convert to binary instruction, such as a Vector Convert to Binary instruction 710a (e.g., VCVB, VCVBG) is obtained by, e.g., a decimal floating-point unit (DFU) 720 of, e.g., one or more computing devices. In this example, condition code set control 424 and overflow result control 432 are used. In one example, if overflow result control 432 is set to a selected value (e.g., 1) and there is an overflow, a short-cut is taken, in which, e.g., slow-mode processing is not needed to provide a result, as described herein. In one example, this is true regardless of the value of condition code set control 424 (i.e., regardless of whether the condition code control is set).

In one example, decimal floating-point unit 720 executes instruction 710*a* to convert 722 at least a portion of a value (e.g., selected input digits) from one data format to another data format. Further, decimal floating-point unit 720 determines 724 whether an overflow condition occurred based on the converting. In one example, this takes approximately 12 cycles (other examples are possible).

If decimal floating-point unit 720 does not detect an overflow condition or if decimal floating-point unit 720 does detect an overflow condition and the overflow result control is set to a selected value (e.g., one), then the conversion process is complete 726 and the latency is the same as the conversion latency (e.g., approximately 12 cycles or other number of cycles). The result is either the converted value, if no overflow, or a chosen default value (e.g., zeros), if an overflow. Thus, the latency for particular programming languages that typically continued the conversion process until completion, even in an overflow scenario, is reduced (e.g., approximately 12 cycles instead of approximately 16 cycles, or another number of cycles).

Further, if decimal floating-point unit 720 does detect an overflow condition and the overflow result control is set to another selected value (e.g., zero) and, e.g., condition code set control 424 is set to another selected value (e.g., zero), then a slow mode request 728 is sent to, e.g., an instruction sequencing unit. The instruction sequencing unit, as an example, re-issues convert instruction 710*a* to, e.g., decimal floating-point unit 720 with an indication to perform the instruction in slow-mode (e.g., no short-cut, perform complete conversion of value). Decimal floating-point unit 720 executes instruction 710*a* to convert 732 a value (e.g., input digits) from one data format to another data format in slow mode. This takes, e.g., approximately 16 cycles (or another number of cycles). When the conversion is complete 734, the latency is equal to the latency of the first convert (e.g., approximately 12 cycles) plus the latency of the second convert (e.g., approximately 16 cycles) plus the slow mode request overhead, which is about 50 cycles (or another number of cycles). Other examples are possible.

Referring to FIG. 7B, an example is provided in which condition code set control 424 is set to a selected value (e.g., 1) and overflow result control 432 is set to another selected value (e.g., 0). In this example, a vector convert to binary instruction, such as a Vector Convert to Binary instruction 710*b* (e.g., VCVB, VCVBG) is obtained by, e.g., a decimal floating-point unit (DFU) 720 of, e.g., one or more computing devices. In one example, decimal floating-point unit 720 executes instruction 710*b* to convert 742 a value (e.g., input digits) from one data format to another data format. This takes, e.g., approximately 16 cycles (or another number of cycles). This conversion is performed in entirety (i.e., absent a short-cut), since a condition code is requested (e.g., CS=1) and the overflow result control is off (e.g., ORC=0). In this example, decimal floating-point unit 720 does not check for an overflow condition during the conversion. It may be checked when the conversion is complete 744, by checking, for instance, the condition code. In this scenario, the latency is equal to e.g., approximately 16 cycles (or another number of cycles). Other examples are possible.

Described above is a capability for reducing processing cycles during change operations that result in overflow conditions, particularly for those programming languages (e.g., PL/I) that determine an overflow condition by checking a condition code. By being able to terminate the change operation prior to completion of the change from one data format to another data format but still complete the instruction and obtain a condition code, processing cycles are saved. This improves performance of the computing device, computing environment and application programs using this feature. By improving the performance of the conversions between data formats, such as decimal and binary data formats, overall performance of programs, such as PL/I and COBOL programs, is enhanced, which further improves processing speed within computing devices and the computing environment.

In one or more aspects, PL/I programs, as well as other programs, such as COBOL and/or other programs/programming languages, can benefit from one or more aspects of the present disclosure. By using one or more aspects of the present disclosure, the lengthy slow-mode penalty may be avoided in certain circumstances. Further, processing is performed by reducing the number of instances that a full conversion is performed when an overflow condition is detected. Yet further, legacy code is preserved since legacy behavior of the instruction is preserved by turning off the overflow result control (e.g., ORC=0). Other examples are possible.

In one or more aspects, execution time of a decimal to binary conversion instruction is decreased, in particular cases. For instance, a performance impact is mitigated by eliminating the computing of unused result bits, which delays the result by, e.g., approximately an additional 4 cycles, for decimal to binary conversions in certain scenarios.

Although various examples are described above, other variations and embodiments are possible. For instance, a convert instruction other than a vector convert instruction may use one or more aspects of the present disclosure. Further, other types of instructions may use one or more aspects of the present disclosure.

Figure 8A:
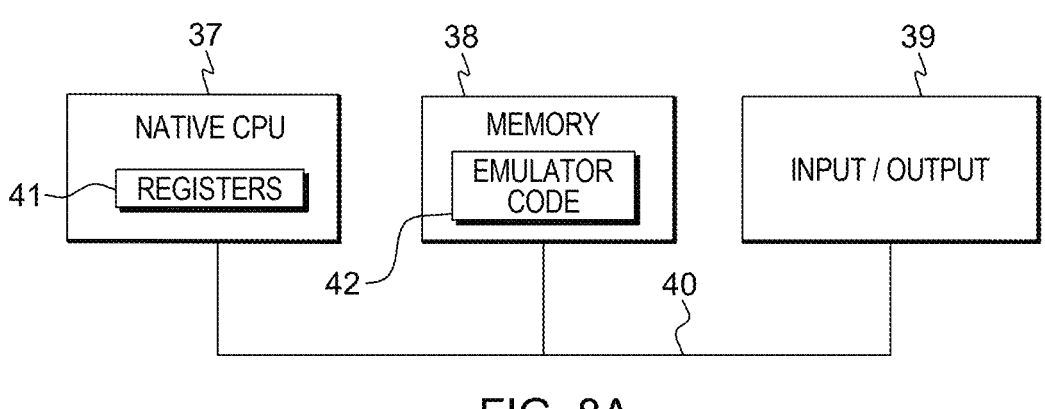
FIGS. 8A-8B depict another example of a computing environment to incorporate and use one or more aspects of the present disclosure.
Figure 8B:
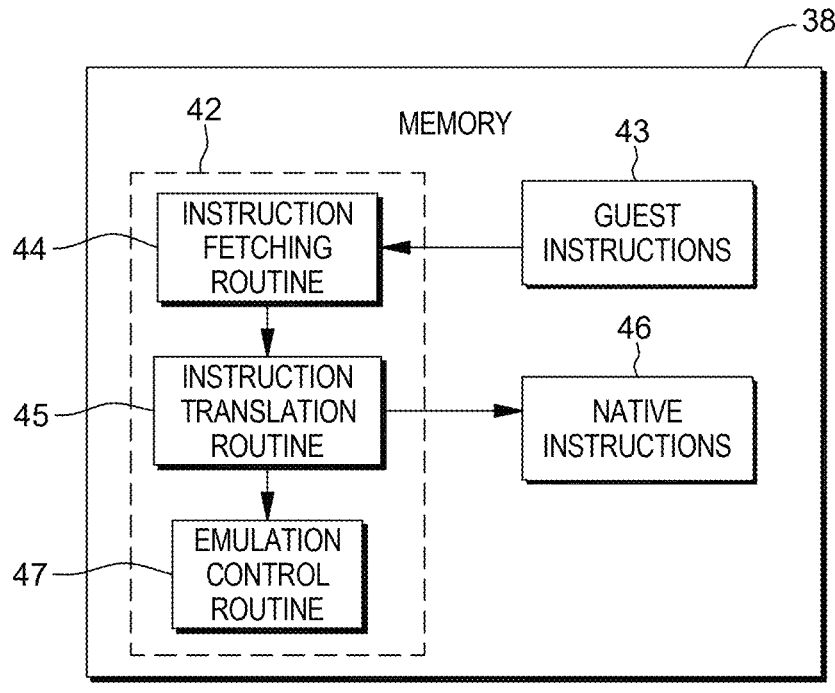

Further, although one or more examples of a computing environment to incorporate and use one or more aspects of the present disclosure are described herein, FIGS. 8A-8B depict another embodiment of a computing environment to incorporate and use one or more aspects of the present disclosure.

Referring, initially, to FIG. 8A, in this example, a computing environment 36 includes, for instance, a native central processing unit (CPU) 37 based on one architecture having one instruction set architecture, a memory 38, and one or more input/output devices and/or interfaces 39 coupled to one another via, for example, one or more buses 40 and/or other connections.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture (different from the one architecture) and to execute software and instructions developed based on the other architecture.

Further details relating to emulator code 42 are described with reference to FIG. 8B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the other instruction set architecture, but instead, are being emulated on native CPU 37, which may be, for example, the one instruction set architecture. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An example instruction that may be emulated is the vector convert to binary instruction described herein, in accordance with one or more aspects of the present disclosure.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to convert a value from one data format to another data format, perform overflow condition processing and/or perform one or more other aspects of the present disclosure.

One or more aspects of the present disclosure are tied to computer technology and facilitate processing within a computer, improving performance thereof. For instance, processing speed is increased, and latency, as well as costs, are reduced. Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer-readable code into a computing system, in which the code in combination with the computing system is capable of performing one or more embodiments.

Yet a further aspect, a process for integrating computing infrastructure comprising integrating computer-readable code into a computer system may be provided. The computer system comprises a computer-readable medium, in which the computer medium comprises one or more embodiments. The code in combination with the computer system is capable of performing one or more embodiments.

Although various embodiments are described above, these are only examples. For example, other instructions, instruction formats, operands and/or registers may be used. Moreover, additional, less and/or other code may be used. Although code may be provided as an example of performing a particular operation or task, additional and/or other code may be used. Code may be combined and are separated. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
   a set of one or more computer-readable storage media; and
   program instructions, collectively stored in the set of one or more computer-readable storage media, for causing at least one computing device to perform computer operations including:
   executing an instruction on a computing device of the at least one computing device, the instruction configured to perform data conversion, the executing the instruction including:
   determining that an overflow condition exists in a change of a value, specified by the instruction, from one data format to another data format, wherein the determining that the overflow condition exists includes:
   executing the instruction to perform up to a selected number of converting operations to change the value from the one data format to the another data format, the selected number of converting operations being dependent on a size of a result location; and
   determining that one or more additional operations over the selected number of converting operations is to be performed to complete the change of the value from the one data format to the another data format, wherein the determining that the one or more additional operations is to be performed signifies that the overflow condition exists, and
   wherein the determining that the overflow condition exists occurs absent performing the one or more additional operations, such that one or more processing cycles are saved by not completing the change and still detecting the overflow condition;
   determining that an overflow result control of the instruction is set to a selected value; and
   providing a result of executing the instruction, the providing the result including placing a chosen default value in the result location based on determining that the overflow condition exists and that the overflow result control is set to the selected value.

2. The computer program product of claim 1, wherein the one data format is a decimal data format and the another data format is a binary data format.

3. The computer program product of claim 1, wherein the chosen default value includes a selected number of zeros.

4. The computer program product of claim 1, wherein the overflow result control is included in a mask field of the instruction.

5. The computer program product of claim 1, wherein the value is included in at least one register specified by the instruction, the overflow result control is included in a mask field of the instruction and the result location is at least one register specified by the instruction.

6. The computer program product of claim 1, wherein the instruction further includes a condition code set control, and based on the condition code set control being set to a particular value, a condition code is provided based on executing the instruction.

7. The computer program product of claim 1, wherein the computer operations further include:
   executing the instruction another time, wherein the executing the instruction the another time includes:
   determining that the overflow condition exists in the change of another value from the one data format to the another data format;
   determining that the overflow result control of the instruction is set to another selected value; and
   providing another result of executing the instruction the another time, the providing the another result including placing at least a portion of a result value of the change of the another value in the result location based on determining that the overflow condition exists and that the overflow result control is set to the another selected value.

8. The computer program product of claim 1, wherein the computer operations further include:
   executing the instruction a further time, wherein the executing the instruction the further time includes:
   determining that the overflow condition does not exist in the change of a further value from the one data format to the another data format; and
   providing a further result of executing the instruction the further time, the providing the further result including placing a result value of the change of the further value in the result location based on determining that the overflow condition does not exist.

9. A computer system comprising:
   at least one computing device;
   a set of one or more computer-readable storage media; and
   program instructions, collectively stored in the set of one or more computer-readable storage media, for causing the at least one computing device to perform computer operations including:
   executing an instruction on a computing device of the at least one computing device, the instruction configured to perform data conversion, the executing the instruction including:
   determining that an overflow condition exists in a change of a value, specified by the instruction, from one data format to another data format, wherein the determining that the overflow condition exists includes:
   executing the instruction to perform up to a selected number of converting operations to change the value from the one data format to the another data format, the selected number of converting operations being dependent on a size of a result location; and
   determining that one or more additional operations over the selected number of converting operations is to be performed to complete the change of the value from the one data format to the another data format, wherein the determining that the one or more additional operations is to be performed signifies that the overflow condition exists, and
   wherein the determining that the overflow condition exists occurs absent performing the one or more additional operations, such that one or more processing cycles are saved by not completing the change and still detecting the overflow condition;
   determining that an overflow result control of the instruction is set to a selected value; and providing a result of executing the instruction, the providing the result including placing a chosen default value in the result location based on determining that the overflow condition exists and that the overflow result control is set to the selected value.

10. The computer system of claim 9, wherein the value is included in at least one register specified by the instruction, the overflow result control is included in a mask field of the instruction and the result location is at least one register specified by the instruction.

11. The computer system of claim 9, wherein the computer operations further include:

executing the instruction a further time, wherein the executing the instruction the further time includes:

determining that the overflow condition does not exist in the change of a further value from the one data format to the another data format; and providing a further result of executing the instruction the further time, the providing the further result including placing a result value of the change of the further value in the result location based on determining that the overflow condition does not exist.

12. The computer system of claim 9, wherein the instruction further includes a condition code set control, and based on the condition code set control being set to a particular value, a condition code is provided based on executing the instruction.

13. The computer system of claim 9, wherein the computer operations further include:

executing the instruction another time, wherein the executing the instruction the another time includes:

determining that the overflow condition exists in the change of another value from the one data format to the another data format;

determining that the overflow result control of the instruction is set to another selected value; and providing another result of executing the instruction the another time, the providing the another result including placing at least a portion of a result value of the change of the another value in the result location based on determining that the overflow condition exists and that the overflow result control is set to the another selected value.

14. A computer-implemented method comprising:

executing an instruction on a computing device, the instruction configured to perform data conversion, the executing the instruction including:

determining that an overflow condition exists in a change of a value, specified by the instruction, from one data format to another data format, wherein the determining that the overflow condition exists includes:

executing the instruction to perform up to a selected number of converting operations to change the value from the one data format to the another data format, the selected number of converting operations being dependent on a size of a result location;

determining that one or more additional operations over the selected number of converting operations is to be performed to complete the change of the value from the one data format to the another data format, wherein the determining that the one or more additional operations is to be performed signifies that the overflow condition exists, and wherein the determining that the overflow condition exists occurs absent performing the one or more additional operations, such that one or more processing cycles are saved by not completing the change and still detecting the overflow condition;

determining that an overflow result control of the instruction is set to a selected value; and providing a result of executing the instruction, the providing the result including placing a chosen default value in the result location based on determining that the overflow condition exists and that the overflow result control is set to the selected value.

15. The computer-implemented method of claim 14, wherein the value is included in at least one register specified by the instruction, the overflow result control is included in a mask field of the instruction and the result location is at least one register specified by the instruction.

16. The computer-implemented method of claim 14, further including:

executing the instruction a further time, wherein the executing the instruction the further time includes:

determining that the overflow condition does not exist in the change of a further value from the one data format to the another data format, and providing a further result of executing the instruction the further time, the providing the further result including placing a result value of the change of the further value in the result location based on determining that the overflow condition does not exist.

17. The computer-implemented method of claim 14, wherein the instruction further includes a condition code set control, and based on the condition code set control being set to a particular value, a condition code is provided based on executing the instruction.

18. The computer-implemented method of claim 14, further including:

executing the instruction another time, wherein the executing the instruction the another time includes:

determining that the overflow condition exists in the change of another value from the one data format to the another data format;

determining that the overflow result control of the instruction is set to another selected value; and providing another result of executing the instruction the another time, the providing the another result including placing at least a portion of a result value of the change of the another value in the result location based on determining that the overflow condition exists and that the overflow result control is set to the another selected value.

19. A computer program product comprising:

a set of one or more computer-readable storage media; and program instructions, collectively stored in the set of one or more computer-readable storage media, for causing at least one computing device to perform computer operations including:

executing an instruction on a computing device of the at least one computing device, the executing the instruction including:

executing, as part of executing the instruction, at least one converting operation of a plurality of converting operations to be executed to change a value specified by the instruction from one data format to another data format, wherein the at least one converting operation but less than the plurality of converting operations is executed;

determining that an overflow condition occurred based on executing the at least one converting operation, wherein the determining is performed based on executing the at least one converting operation to change the value from the one data format to the another data format and prior to completing execution of the plurality of converting operations to change the value, in which one or more processing cycles are saved by not completing the change and still detecting the overflow condition;

determining that an overflow result control of the instruction is set to a selected value; and providing a result of executing the instruction, the providing the result including placing a chosen default value in a result location based on determining that the overflow condition occurred and that the overflow result control is set to the selected value.

20. The computer program product of claim 19, wherein the value is included in at least one register specified by the instruction, the overflow result control is included in a mask field of the instruction and the result location is at least one register specified by the instruction.

21. The computer program product of claim 19, wherein the instruction further includes a condition code set control, and based on the condition code set control being set to a particular value, a condition code is provided based on executing the instruction.

22. A computer-implemented method comprising:

executing an instruction on a computing device, the executing the instruction including:

executing, as part of executing the instruction, at least one converting operation of a plurality of converting operations to be executed to change a value specified by the instruction from one data format to another data format, wherein the at least one converting operation but less than the plurality of converting operations is executed;

determining that an overflow condition occurred based on executing the at least one converting operation, wherein the determining is performed based on executing the at least one converting operation to change the value from the one data format to the another data format and prior to completing execution of the plurality of converting operations to change the value, in which one or more processing cycles are saved by not completing the change and still detecting the overflow condition;

determining that an overflow result control of the instruction is set to a selected value; and providing a result of executing the instruction, the providing the result including placing a chosen default value in a result location based on determining that the overflow condition occurred and that the overflow result control is set to the selected value.

23. The computer-implemented method of claim 22, wherein the value is included in at least one register specified by the instruction, the overflow result control is included in a mask field of the instruction and the result location is at least one register specified by the instruction.

24. The computer-implemented method of claim 22, wherein the instruction further includes a condition code set control, and based on the condition code set control being set to a particular value, a condition code is provided based on executing the instruction.

25. The computer-implemented method of claim 22, further including:

executing the instruction another time, wherein the executing the instruction the another time includes:

determining that the overflow condition exists in the change of another value from the one data format to the another data format;

determining that the overflow result control of the instruction is set to another selected value; and providing another result of executing the instruction the another time, the providing the another result including placing at least a portion of a result value of the change of the another value in the result location based on determining that the overflow condition exists and that the overflow result control is set to the another selected value.

* * * * *